US009318151B2

(12) United States Patent
Lee et al.

(10) Patent No.: US 9,318,151 B2
(45) Date of Patent: Apr. 19, 2016

(54) MOBILE TERMINAL AND METHOD FOR CONTROLLING THE SAME

(75) Inventors: Joowoo Lee, Seoul (KR); Sunjung Lee, Seoul (KR); Kyunghye Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 13/208,271

(22) Filed: Aug. 11, 2011

(65) Prior Publication Data

US 2012/0105703 A1    May 3, 2012

(30) Foreign Application Priority Data

Nov. 3, 2010 (KR) .................. 10-2010-0108596

(51) Int. Cl.
| | |
|---|---|
| G11B 27/034 | (2006.01) |
| G06T 11/60 | (2006.01) |
| G11B 27/10 | (2006.01) |
| G11B 27/28 | (2006.01) |
| G11B 27/32 | (2006.01) |
| G11B 27/34 | (2006.01) |

(52) U.S. Cl.
CPC .............. *G11B 27/034* (2013.01); *G06T 11/60* (2013.01); *G11B 27/105* (2013.01); *G11B 27/28* (2013.01); *G11B 27/322* (2013.01); *G11B 27/34* (2013.01)

(58) Field of Classification Search
USPC ........................................................ 345/633
See application file for complete search history.

(56) References Cited

U.S. PATENT DOCUMENTS

| | | | | |
|---|---|---|---|---|
| 6,414,696 | B1* | 7/2002 | Ellenby et al. ................ 715/762 |
| 7,110,909 | B2* | 9/2006 | Friedrich et al. ............. 702/150 |
| 7,162,054 | B2* | 1/2007 | Meisner et al. ............... 382/103 |
| 2005/0251030 | A1* | 11/2005 | Azar et al. .................... 600/429 |
| 2006/0190812 | A1* | 8/2006 | Ellenby et al. ................ 715/512 |
| 2007/0024527 | A1* | 2/2007 | Heikkinen et al. ............... 345/9 |
| 2008/0071559 | A1* | 3/2008 | Arrasvuori ....................... 705/1 |
| 2008/0147730 | A1* | 6/2008 | Lee et al. .................. 707/104.1 |
| 2009/0154293 | A1 | 6/2009 | Sengupta et al. |
| 2009/0167787 | A1* | 7/2009 | Bathiche et al. .............. 345/633 |
| 2010/0309225 | A1* | 12/2010 | Gray et al. .................... 345/633 |
| 2011/0153310 | A1* | 6/2011 | Ehlen et al. ....................... 704/9 |
| 2011/0310120 | A1* | 12/2011 | Narayanan .................... 345/633 |

FOREIGN PATENT DOCUMENTS

CN              201585046          9/2010

* cited by examiner

*Primary Examiner* — James A Thompson
(74) *Attorney, Agent, or Firm* — Lee, Hong, Degerman, Kang & Waimey

(57) ABSTRACT

A method for controlling a mobile terminal includes displaying a preview image input by a camera in an augmented reality (AR) mode, displaying AR data corresponding to at least one object in the preview image, and providing a user interface for editing at least a portion of the preview image including the AR data in the AR mode in order to generate an edited preview image.

28 Claims, 36 Drawing Sheets

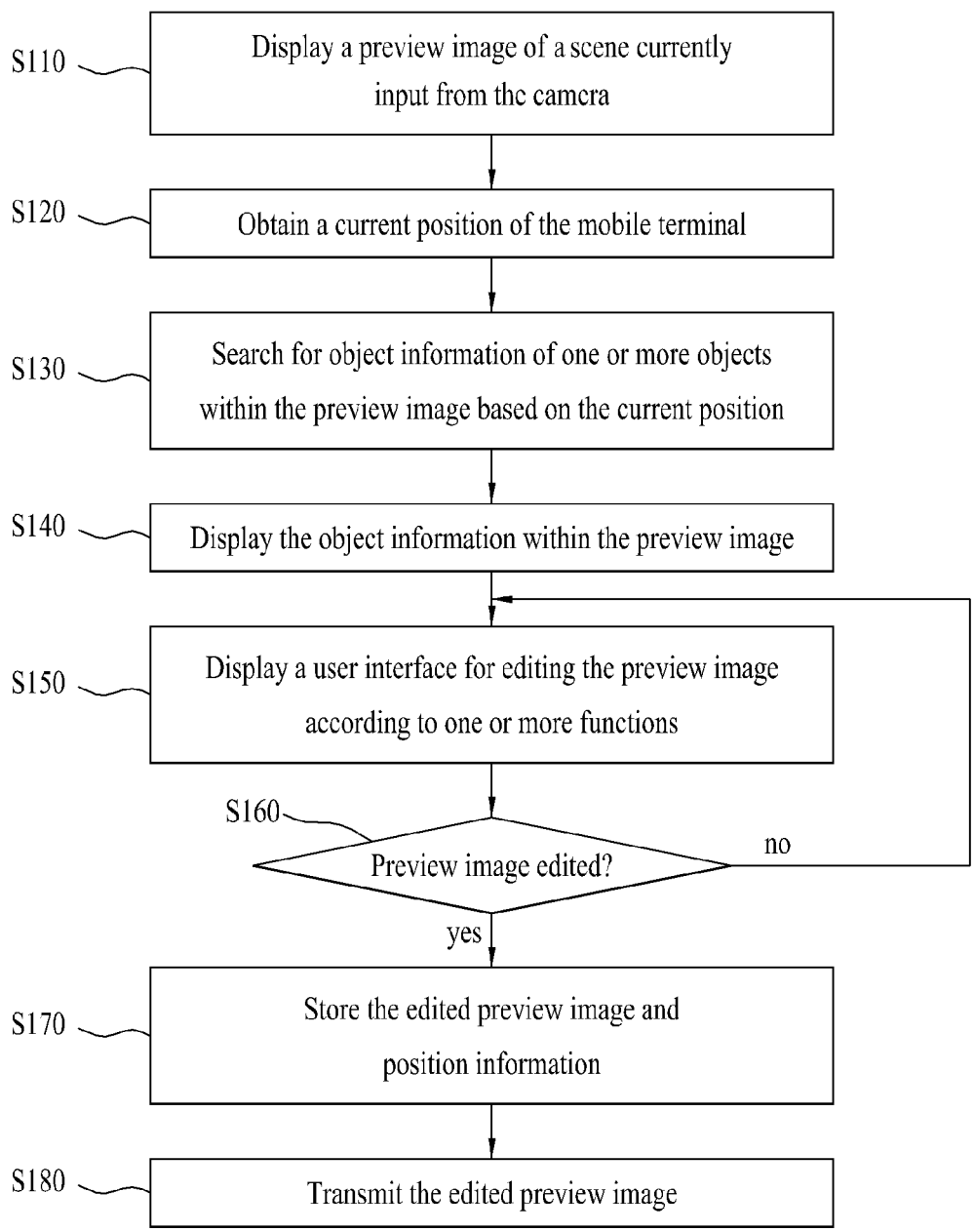

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2010-0108596, filed on Nov. 3, 2010, the contents of which are hereby incorporated by reference herein in their entirety.

FIELD OF THE INVENTION

The present invention relates to a mobile terminal, and more particularly, to a mobile terminal and a method of controlling the mobile terminal.

DESCRIPTION OF THE RELATED ART

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified as mobile terminals and stationary terminals. Furthermore, the mobile terminals can be classified as handheld terminals and vehicle mount terminals according to whether users can carry the terminals on their person.

There are ongoing efforts to support and increase the functionality of mobile terminals. Such efforts include software and hardware improvements, as well as changes and improvements in the structural components which form the mobile terminal.

Recently, mobile terminals are being equipped with an augmented reality (AR) function for providing information of an object located within a preview image of a camera.

SUMMARY OF THE INVENTION

Accordingly, the present invention is directed to a mobile terminal and a method for controlling the same, which substantially obviate one or more problems due to limitations and disadvantages of the related art.

According to one embodiment, a method for controlling a mobile terminal includes displaying, on a display, a preview image input by a camera in an augmented reality (AR) mode. The method further includes displaying, on the display, AR data corresponding to at least one object in the preview image and providing a user interface for editing at least a portion of the preview image including the AR data in the AR mode in order to generate an edited preview image.

It is contemplated that the method further includes storing the edited preview image in a memory. It is further contemplated that the method includes transmitting the stored edited preview image.

It is contemplated that the method further includes transmitting the edited preview image.

It is contemplated that the method further includes searching at least one stored edited preview image in the AR mode, and displaying AR data of the searched at least one stored edited preview image that corresponds to at least a same object in the preview image or a position of the preview image, where displaying the AR data is performed by either overlaying at least a portion of the searched at least one stored edited preview image on the preview image or displaying the searched at least one stored edited preview image.

It is contemplated that the method further includes, identifying an object in the preview image, determining whether the object in the preview image is the same as an object in a previously received edited preview image in the AR mode, and displaying AR data corresponding to the object in the previously received edited preview image on the object in the preview image based on the determination by either overlaying at least a portion of the previously received edited preview image on the preview image or displaying the previously received edited preview image.

It is contemplated that the method further includes editing the at least a portion of the preview image by changing an appearance of at least the AR data or the at least one object in response to input received via the user interface in accordance with at least one function. It is further contemplated that the at least one function is used to distinguish at least the AR data or the at least one object in the preview image.

It is contemplated that editing the at least a portion of the preview image includes zooming-in or zooming-out of the preview image in response to input received via the user interface such that the edited preview image is a zoomed-in or zoomed-out preview image and further includes storing the zoomed-in or zoomed-out preview image in a memory.

It is contemplated that the method further includes storing a value representing a magnification power of the zoomed-in or zoomed-out preview image and position information of the zoomed-in or zoomed-out preview image, and applying the value representing the magnification power to the preview image.

It is contemplated that editing the at least a portion of the preview image includes inputting a memo or scribble message on the preview image in response to the input received via the user interface and further includes storing the edited preview image including the memo or scribble message in a memory.

It is contemplated that the user interface provides a function for importing at least one image onto the preview image and merging the at least one image with the preview image in order to generate the edited preview image and further includes storing the edited preview image including the at least one image in a memory.

It is contemplated that importing the at least one image includes dragging and dropping the at least one image on a zone within the preview image where the at least one image is to be merged, or designating a zone within the preview image where the at least one image is to be merged.

It is contemplated that importing the at least one image includes designating a first zone within the at least one image, cropping the at least one image according to the first zone in order to generate at least one cropped image, and designating a second zone within the preview image where the at least one cropped image is to be merged.

It is contemplated that the user interface further provides a function for receiving a keyword for searching at least the memory or the Internet for at least one image that is related to the keyword.

It is contemplated that the user interface provides a function for linking information to the preview image and further includes storing the preview image that has been linked in a memory, the information related to the preview image.

According to another embodiment, a method for controlling a mobile terminal includes receiving a transmission including an edited preview image that was previously generated by editing at least a portion of a preview image including augmented reality (AR) data in an AR mode, determining a current position of the mobile terminal, and displaying, on a display, the edited preview image when the current position of the mobile terminal is the same as a position corresponding to the edited preview image, where displaying the edited preview image is performed by either overlaying at least a portion of the edited preview image on a current preview image or displaying the entire edited preview image.

It is contemplated that the transmission further includes the position corresponding to the edited preview image.

It is contemplated that the method further includes determining the position corresponding to the edited preview image by comparing the edited preview image to a current preview image input by a camera.

According to another embodiment, a mobile terminal includes a display configured to display a preview image input by a camera in an augmented reality (AR) mode and to display AR data corresponding to at least one object in the preview image, and a controller configured to provide a user interface for editing at least a portion of the preview image including the AR data in the AR mode in order to generate an edited preview image.

It is contemplated that the controller is further configured to store the edited preview image in a memory. It is further contemplated that the controller is configured to transmit the stored edited preview image.

It is contemplated that the controller is further configured to transmit the edited preview image.

It is contemplated that the controller is further configured to search at least one stored edited preview image in the AR mode, where the display is further configured to display AR data of the searched at least one stored edited preview image that corresponds to at least a same object in the preview image or a position of the preview image, and where the AR data of the searched edited preview image is displayed by either overlaying at least a portion of the searched at least one stored edited preview image on the preview image or displaying the searched at least one stored edited preview image.

It is contemplated that the controller is further configured to identify an object in the preview image and determine whether the object in the preview image is the same as an object in a previously received edited preview image in the AR mode, where the display is further configured to display AR data corresponding to the object in the previously received edited preview image on the object in the preview image based on the determination by either overlaying at least a portion of the previously received edited preview image on the preview image or displaying the previously received edited preview image.

It is contemplated that the controller is further configured to edit the at least a portion of the preview image by changing an appearance of at least the AR data or the at least one object in response to input received via the user interface in accordance with at least one function.

It is contemplated that the at least one function is used to distinguish at least the AR data or the at least one object in the preview image.

It is contemplated that the controller is further configured to edit the at least a portion of the preview image by zooming-in or zooming-out of the preview image in response to input received via the user interface such that the edited preview image is a zoomed-in or zoomed-out preview image, and store the zoomed-in or zoomed-out preview image in a memory.

It is contemplated that the controller is further configured to store a value representing a magnification power of the zoomed-in or zoomed-out preview image and position information of the zoomed-in or zoomed-out preview image, and apply the value representing the magnification power to the preview image.

It is contemplated that the controller is further configured to edit the at least a portion of the preview image by receiving a memo or scribble message input on the preview image via the user interface and store the edited preview image including the memo or scribble message in a memory.

It is contemplated that the controller is further configured to provide the user interface having a function for importing at least one image onto the preview image and merging the at least one image with the preview image in order to generate the edited preview image. It is further contemplated that the controller is further configured to store the edited preview image including the at least one image in a memory.

It is contemplated that importing the at least one image includes dragging and dropping the at least one image on a zone within the preview image where the at least one image is to be merged or designating a zone within the preview image where the at least one image is to be merged.

It is contemplated that importing the at least one image includes designating a first zone within the at least one image, cropping the at least one image according to the first zone to generate at least one cropped image, and designating a second zone within the preview image where the at least one cropped image is to be merged.

It is contemplated that the controller is further configured to provide the user interface further having a function for receiving a keyword for searching at least the memory or the Internet for the at least one image that is related to the keyword.

It is contemplated that the controller is further configured to provide the user interface having a function for linking information to the preview image, the information related to the preview image, and store the preview image that has been linked in a memory.

According to another embodiment, a mobile terminal includes a controller configured to receive a transmission comprising an edited preview image that was previously generated by editing at least a portion of a preview image including augmented reality (AR) data in an AR mode and determine a current position of the mobile terminal. The mobile terminal further includes a display configured to display the edited preview image when the current position of the mobile terminal is the same as a position corresponding to the edited preview image, where the edited preview image is displayed by either overlaying at least a portion of the edited preview image on a current preview image or displaying the entire edited preview image.

It is contemplated that the transmission further includes the position corresponding to the edited preview image. It is further contemplated that the mobile terminal further includes a camera configured to generate the current preview image and wherein the controller is further configured to determine the position corresponding to the edited preview image by comparing the edited preview image to the current preview image.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 3 is a flow chart illustrating a method performed by the mobile terminal for editing a preview image in an augmented reality (AR) mode in accordance with one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, it should be understood that the present invention can also be applied to other types of terminals.

Figure 1:
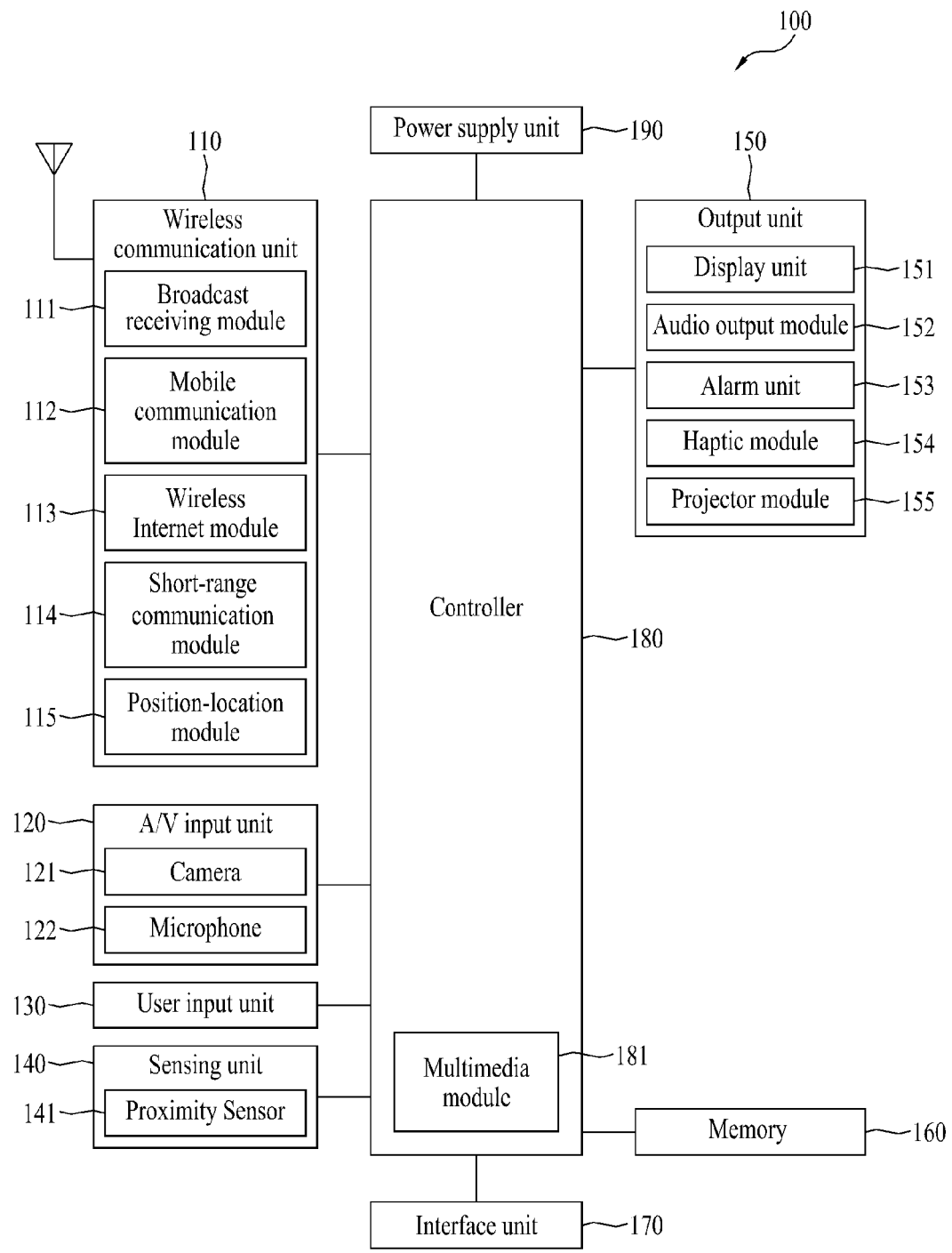
FIG. 1 illustrates a block diagram of a mobile terminal in accordance with one embodiment of the present invention.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast—convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The mobile communication module 112 can further transmit current position information of the mobile terminal 100 obtained via the position-location module 115 to an external server (not shown in the drawing), and receive or download data related to an area in which the mobile terminal 100 is located from the external server. In such a case, detailed map data of the area can be included in the data as well as an image representing the area where the mobile terminal 100 is located.

Moreover, an object information database related to objects located within a specific radius of the area can be included in the map data. For example, the objects can include buildings and establishments located in the buildings, such as a hospital, restaurant, restroom, police station, or community center.

A real-world image of each area, position information of the objects included in the real-world image, and detailed information on the objects can be included in the map data. For example, the real-world image can include an image having the same view of a preview image that is input via the camera 121 or an aerial view image.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA). Moreover, the wireless Internet module 113 can receive or download the data relevant to the area in which the mobile terminal 100 is located from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™.

Moreover, as mentioned in the foregoing description, the short-range communication module 114 can receive or download the data relevant to the area in which the mobile terminal 100 is located from the external server of another terminal located in the vicinity of the mobile terminal 100.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be transmitted to an external device via the wireless communication unit 110. Other embodiments of the mobile terminal 100 can include more than one camera 121.

The microphone 122 can receive an external audio signal while operating in a particular mode, such as a phone call mode, a recording mode or a voice recognition mode, and can process the received audio signal into electrical audio data.

The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

An object information database including object information of objects, such as buildings, shops, and road signs, can be stored in the memory 160. For example, the object information database can be searched using either pattern recognition information related to an object within a preview image captured via the camera 121 or position information of the mobile terminal 100 obtained via the position-location module 115. The object information of an object recognized via a search can include relevant text information, such as a name of a building or shop, relevant link information, such as link information of the building or shop, relevant image information, such as an image logo of the building or shop, and relevant audio information, such as a song related to the building or shop.

The object information database stored in the memory 160 can be downloaded or updated from a database of the external server via the wireless communication unit 110. The object information database stored in the memory 160 can include either the entire database downloaded from the external server or a portion of the database downloaded from the external server depending on the storage capacity of the memory 160.

A portion of the database of the external server can be provided for an object located within a predetermined distance from a current position of the mobile terminal 100 or for an object located in a predetermined area, such as an administrative district, related to a current position of the mobile terminal 100.

Contact information including a number of counterpart video images can be stored in the memory 160. In such a case, the contact information can include a name, video image, phone number, email address and fax number of a corresponding counterpart.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 can serve as a conduit to allow power from the cradle to be supplied to the mobile terminal 100, or can serve as a conduit to allow various command signals input by the user via the external cradle to be transmitted to the mobile terminal 100. Various command signals or power provided by the external cradle can be used as signals for recognizing that the mobile terminal 100 is properly loaded in the external cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen. In one embodiment, the controller 180 can identify a desired portion of a predetermined image, such as a camera preview image or other displayed image, via the pattern recognition process.

The controller 180 can be configured to implement augmented reality (AR) technology. AR is a type of a virtual reality that provides a single image generated by combining an image of a real-world scene as viewed by the user's naked eye and an image of a virtual-world that includes side information. Conceptually, AR complements an image of the real-world with a virtual-world by, for example, providing geographical information about the real-world. The controller 180 can display the object information in the form of AR.

The controller 180 can include an object information module (not shown) to perform processing related to the display of the object information. The object information module can be integrated in the controller 180 or configured externally to the controller 180.

The controller 180 can include a multimedia module 181 for playing multimedia. The multimedia module 181 can be integrated into the controller 180 as shown in FIG. 1, or can be external to the controller 180.

The power supply unit 190 can be an external power source, an internal power source, or a combination thereof. The power supply unit 190 can supply power to other components in the mobile terminal 100.

Various embodiments described herein can be implemented via a computer-readable medium using, for example, computer software, hardware, or a combination thereof. For example, the components of the mobile terminal 100 described herein can be implemented in hardware using at least application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, and/or combinations thereof. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
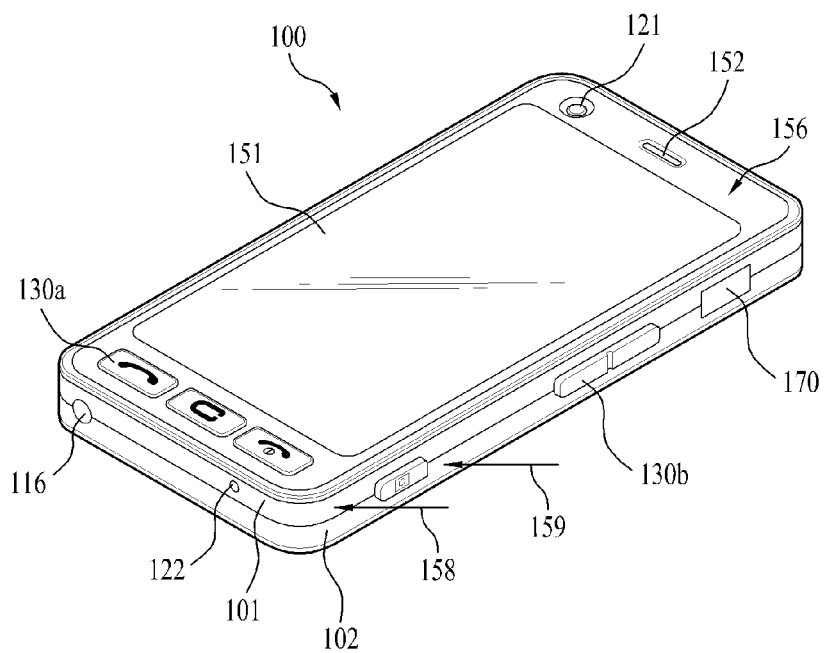
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
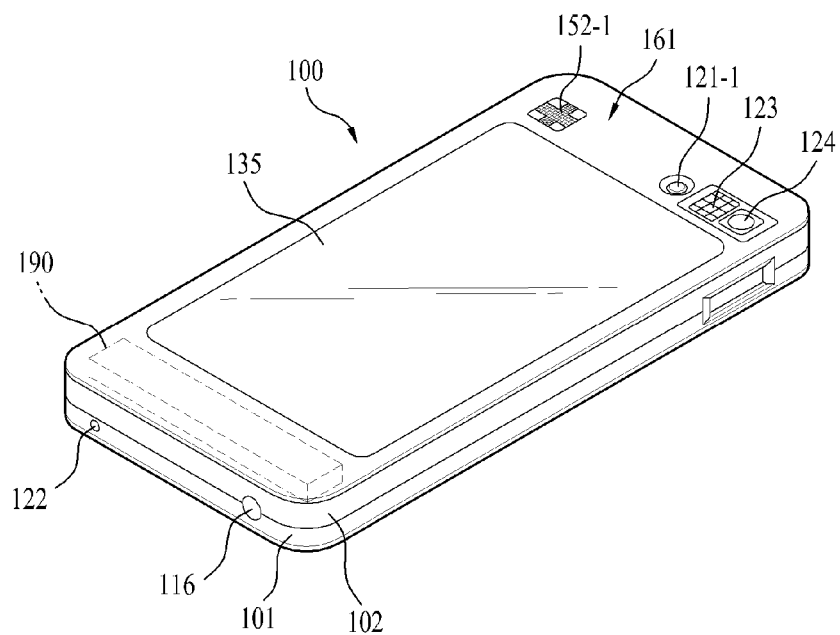
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

FIG. 3 is a flow chart illustrating a method performed by the mobile terminal 100 for editing a preview image in an augmented reality (AR) mode in accordance with one embodiment of the present invention. Referring to FIG. 3, the controller 180 of the mobile terminal 100 drives the camera 121 if a menu function for entering an AR mode is selected by the user, and displays a preview image 300 of a scene currently input by the camera 121 on the touch screen 151 [S110].

The controller 180 obtains the current position of the mobile terminal 100 through the position information module 115 [S120]. For example, the position information module 115 can receive position information from a satellite, such as latitude, longitude, altitude and direction of the mobile terminal 100.

The controller 180 can search for object information of one or more objects existing in the preview image from an object information database in the memory 160 based on the current position of the mobile terminal 100 [S130]. In one embodiment, the controller 180 can recognize a pattern of the objects existing in the preview image and search for object information corresponding to the recognized pattern from the object information database in the memory 160. For example, the object information can include a name, contact address and detailed position of the corresponding object.

If a search of the object information database is performed to identify the object information of the objects existing in the preview image, the controller 180 displays the object information at the corresponding positions of the objects within the preview image in accordance with an AR scheme [S140]. The operating mode of the mobile terminal 100 in accordance with the steps S110 to S140 will hereinafter be referred to as the "AR mode."

The controller 180 displays a UI for editing the preview image, the objects or object information displayed in the preview image in accordance with one or more functions [S150]. More specifically, the UI provides a tool that can be used to edit the preview image in accordance with various functions, which will be described below with reference to FIGS. 4A through 24.

If the preview image, the objects or the object information displayed in the preview image have been edited using the UI [S160], the controller 180 stores the edited preview image in the memory 160 together with position information corresponding to a portion of the preview image that has been edited [S170]. For example, the stored position information can later be used to display the edited preview image if the mobile terminal 100 is again located at the position corresponding to the portion of the preview image that was previously edited.

For example, a user of the mobile terminal 100 can edit a current preview image, the objects or the object information in the current preview image. The mobile terminal 100 can then store the edited preview image, the edited objects or object information in the current preview image. The stored preview image can be displayed if the mobile terminal 100 returns to the position corresponding to the stored position information as the user holds and operates the mobile terminal 100.

In one embodiment, the controller 180 can be configured to display the stored preview image without using the position information if the mobile terminal 100 is located at the position corresponding to the edited portion of the stored preview image. More specifically, the controller 180 can display the stored preview image if the preview image currently input from the camera 121 is the same as the stored preview image.

For example, if the current preview image input from the camera 121 is the same as the stored preview image, the controller 180 can extract the edited portion from the stored preview image and display the extracted portion by merging the extracted portion with the current preview image at a corresponding position on the current preview image. Alternatively, the controller 180 can display the extracted portion by overlaying the extracted portion on the current preview image at a corresponding position of the current preview image. When the controller 180 displays the edited preview image, the controller 180 can be configured to no longer display the current preview image input from the camera 121 and to display the edited preview image on the screen for AR if the mobile terminal 100 is operating in the AR mode.

When the controller 180 displays the edited preview image, if the mobile terminal 100 is operating in the AR mode, the controller 180 can extract the edited portion only from the edited preview image by comparing the current preview image input from the camera 121 with the edited preview image, and display the extracted portion by overlaying or merging the extracted portion with the corresponding portion of the current preview image input from the camera 121. If the mobile terminal 100 is not operating in the AR mode, the controller 180 can display the edited preview image by displaying only a frame of the edited preview image on the current screen, or switch the operation of the mobile terminal 100 to the AR mode and display the edited preview image on the screen based on the AR mode.

The controller 180 can transmit the edited and stored preview image to a contact address of a specific other mobile terminal through the wireless communication unit 110 [S180]. For example, if the contact address of the specific other mobile terminal is input when the preview image is being edited or before the preview image is edited, the controller 180 can transmit the edited preview image to the specific other mobile terminal via the wireless communication unit 110.

The controller 180 can also transmit the position information corresponding to the portion of the preview image that has been edited to the specific other mobile terminal together with the edited preview image. For example, after the specific other mobile terminal receives the edited preview image and the position information corresponding to the portion of the preview image that has been edited from the mobile terminal 100, the specific other mobile terminal displays the received preview image if the current position of the specific other mobile terminal corresponds to the received position information.

Therefore, the user of the mobile terminal 100 can edit the preview image and transmit the edited preview image to the specific other mobile terminal if a portion of the preview image currently input to the camera 121 is the portion agreed to with the party using the specific other mobile terminal or is an important portion. The specific other mobile terminal can display the edited preview image if the current position of the specific other mobile terminal corresponds to the portion of the received preview image that has been edited.

The specific other mobile terminal can display the received preview image without the position information corresponding to the edited preview image if the specific other mobile terminal is again located at the position corresponding to the portion where the preview image is edited. In other words, after the edited preview image is received, the specific other mobile terminal can display the received preview image if the preview image currently input from the camera 121 is the same as the received preview image.

If the preview image currently input from a camera of the specific other mobile terminal is the same as the received preview image, the specific other mobile terminal can extract the edited portion from the received preview image and display the extracted portion by merging the extracted portion with the current preview image at a corresponding position on the current preview image. Alternatively, the specific other mobile terminal can display the extracted portion by overlaying the extracted portion on the current preview image at a corresponding position of the current preview image.

The specific other mobile terminal can be configured to no longer display the preview image currently input from the camera of the specific other mobile terminal and to display the received preview image on the screen for AR if the specific other mobile terminal is currently operating in the AR mode. When the specific other mobile terminal displays the received preview image while operating in the AR mode, the specific other mobile terminal can extract only the edited portion from the received preview image by comparing the current preview image input from the camera of the specific other mobile terminal with the received preview image, and display the extracted portion by overlaying or merging the extracted portion with the corresponding portion of the preview image currently input from the camera of the specific other mobile terminal.

When displaying the received preview image, the specific other mobile terminal can display only a frame of the received preview image on the screen if the specific other mobile terminal is not operating in the AR mode. Alternatively, the specific other mobile terminal can switch the current operating mode to the AR mode and display the received preview image on the screen based on the AR mode when the specific other mobile terminal is not operating in the AR mode.

When displaying the received preview image, the specific other mobile terminal can identify the position of the preview image currently input from the camera of the specific other mobile terminal and the position of the received preview image, calculate the distance to reach the portion corresponding to the received preview image, calculate a time period and route for traveling to the portion corresponding to the received preview image from the current position, and display the calculated distance, time period, and route.

In one embodiment, the controller 180 can share the edited preview image with a number of other mobile terminals of other parties by transmitting the edited preview image to an external server via the wireless communication unit 110. For example, the external server can be a server that allows two or more mobile terminals to share preview images edited by the two or more mobile terminals.

According to one embodiment of the present invention, the appearance of a specific object or object information in a preview image of the AR mode can be edited using a UI that provides an edit function for changing a display style of the specific object or object information. FIGS. 4A through 8C are exemplary display screens of the display unit 151 showing various operations for editing a preview image of the AR mode by changing a display style of a specific object or object information in accordance with various embodiments of the present invention.

Figure 4A:
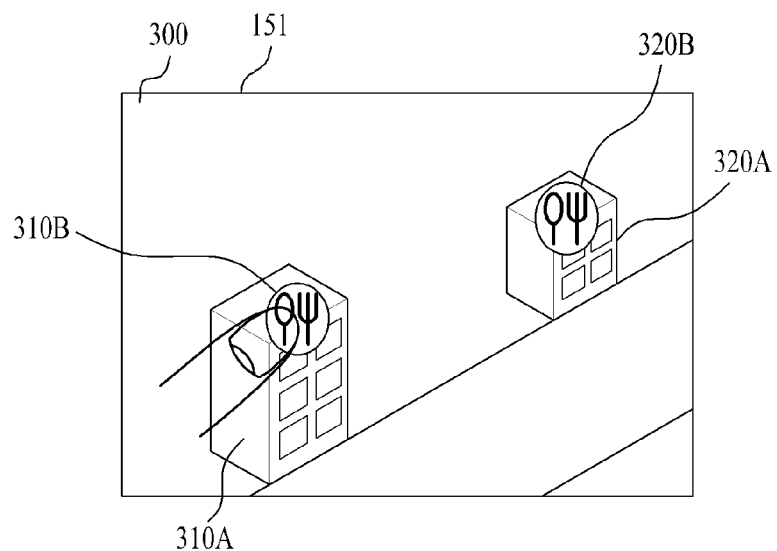
FIGS. 4A through 8C are exemplary display screens of the display unit of the mobile terminal showing an operation for editing a preview image of the AR mode by changing a display style of a specific object or object information in accordance with various embodiments of the present invention.
Figure 4B:
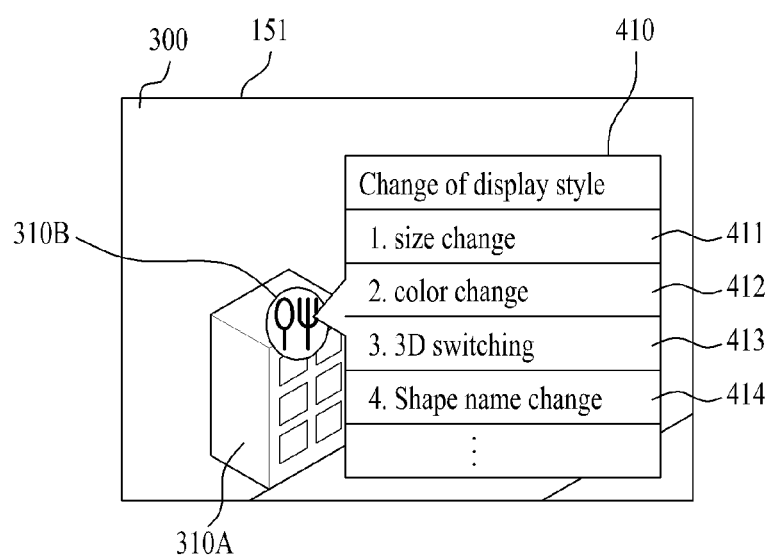

As shown in FIG. 4A, an edit command for editing a display style of the object information 310B of the object 310A can be input when the object information 310B of object 310A and the object information 320B of object 320A are displayed in the preview image 300 of the AR mode. As shown in FIG. 4B, the controller 180 can then display the UI 410 that provides edit functions for changing the display style of the object information 310B.

In one embodiment, the edit command can be a selection operation for selecting one of the objects 310A and 320A and the object information 310B and 320B to be edited. For example, as shown in FIG. 4A, a selection operation can be performed on the object information 310B. As shown in FIG. 4B, the UI 410 can provide edit functions for changing one or more display styles of the object information 310B selected in FIG. 4A.

In one embodiment, the edit functions can include a size change function 411, a color change function 412, a 3D switching function 413 and a shape name change function 414 as shown in FIG. 4B. It should be understood that the edit functions for changing a display style are not limited to the examples discussed herein and the UI 410 can include all edit functions for changing a display style of objects or object information in a preview image of the AR mode.

An operation of the mobile terminal 100 for editing a display style of the object information 310B by using the exemplary edit functions 411 through 414 of the UI 410 will now be described with reference to FIGS. 5A through 8C.

Figure 5A:
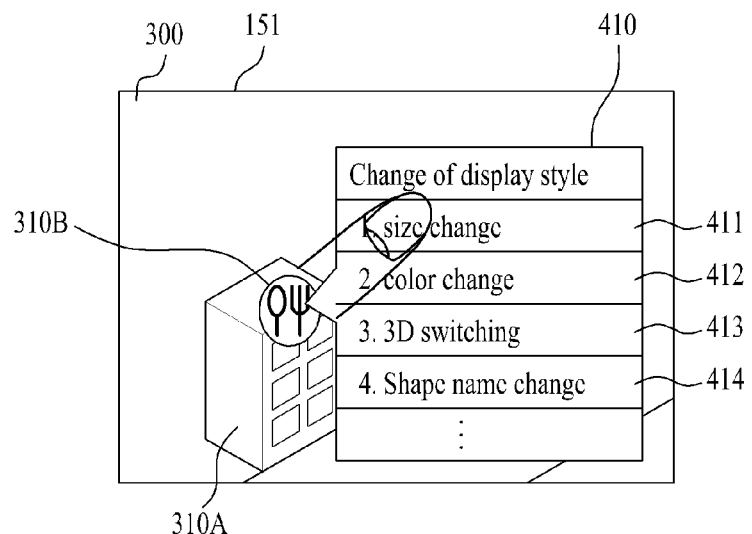
Figure 5B:
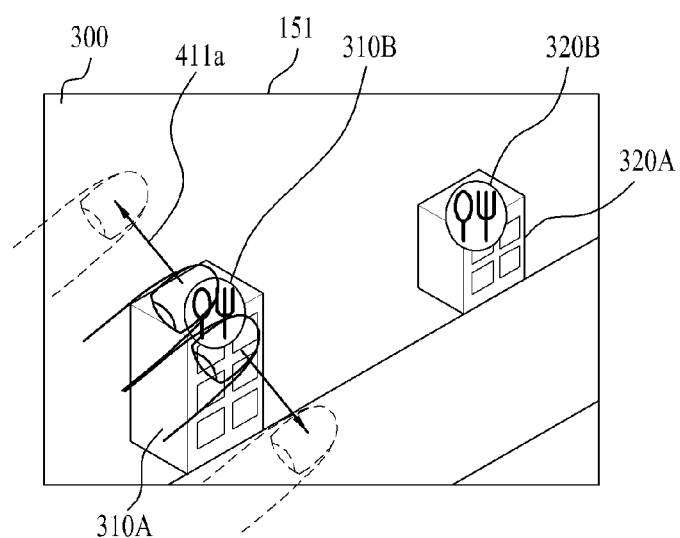
Figure 5C:
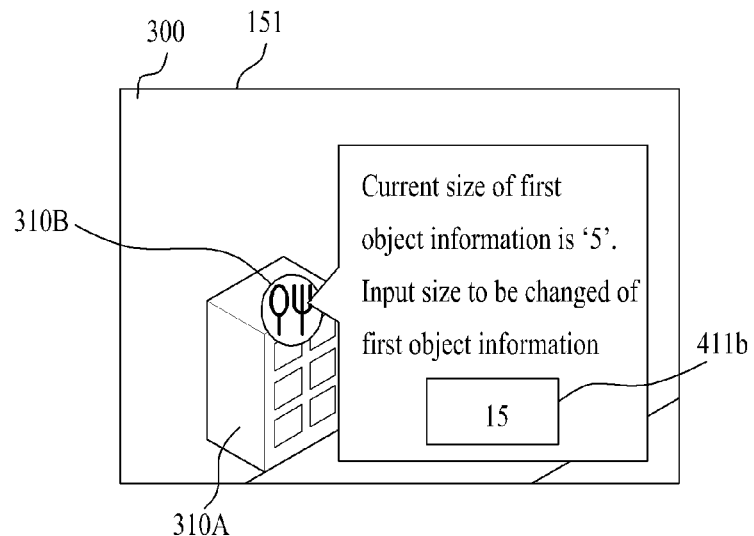
Figure 5D:
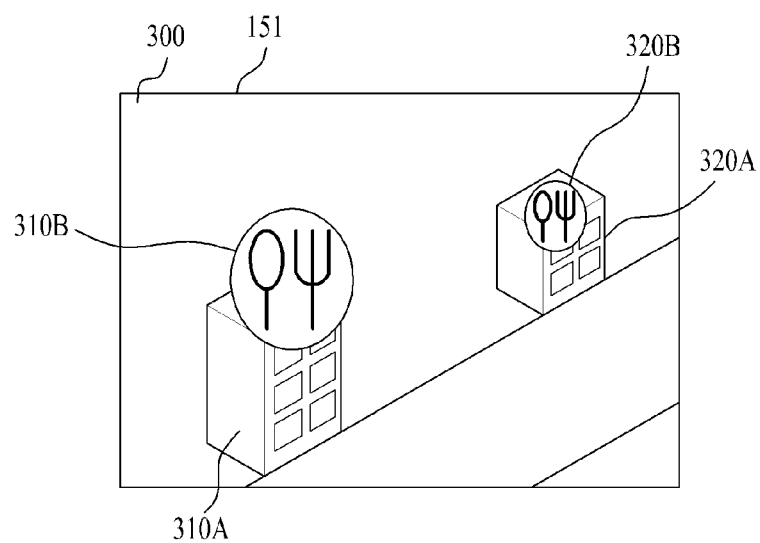

As shown in FIG. 5A, a size change function 411 can be selected from the UI 410. A command for changing the size of the object information 310B can then be input as shown in FIG. 5B or FIG. 5C. As shown in FIG. 5D, the controller 180 can change the size of the object information 310B according to the corresponding command for changing the size of the object information 310B.

In FIG. 5B, the command for changing the size of the object information 310B is input via a multi-touch input 411a that is performed using a pinching-out gesture. More specifically, the multi-touch input 411a can be performed by touching first and second points on the object information 310B and gradually increasing the distance between the first and second points. Therefore, if the multi-touch input 411a is performed using a pinching-out gesture on the object information 310B, the controller 180 increases the size of the object information 310B by an amount corresponding to the increased distance between the first and second points.

Although not shown in FIG. 5B, a multi-touch input can alternatively be performed using a pinching-in gesture. More specifically, a multi-touch input can be performed by touching first and second points on the object information 310B and gradually decreasing the distance between the first and second points. Therefore, if such a multi-touch input is performed using a pinching-in gesture on the object information 310B, the controller 180 can decrease the size of the object information 310B by an amount corresponding to the decreased distance between the first and second points.

In FIG. 5C, the command for changing the size of the object information 310B can be input via a size input window 411b, which can be used to input a value representing a desired size to be applied to the object information 310B. For example, when a value, such as "15", is input in the size input window 411b, the controller 180 can change the size of the object information 310B to the size corresponding to the value as shown in FIG. 5D.

Figure 6A:
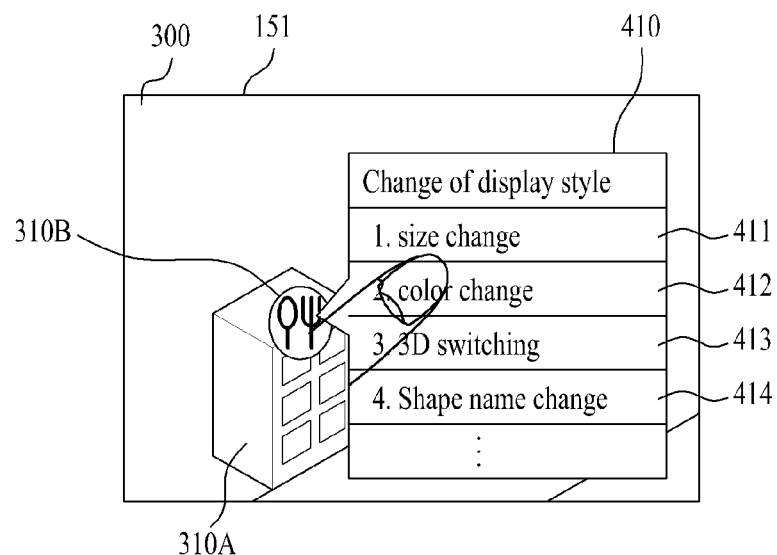
Figure 6B:
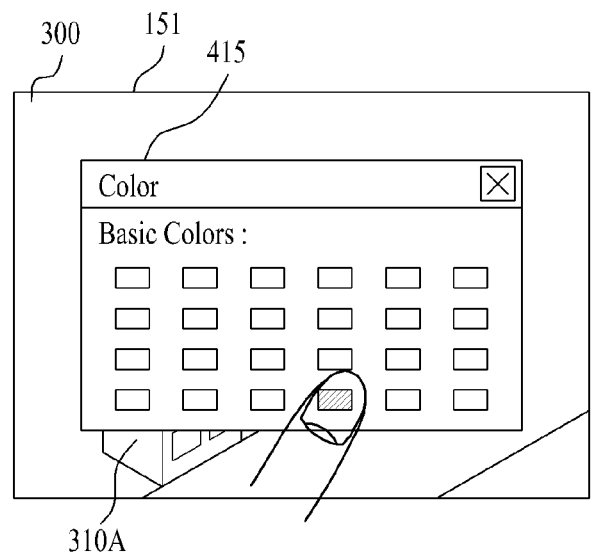
Figure 6C:
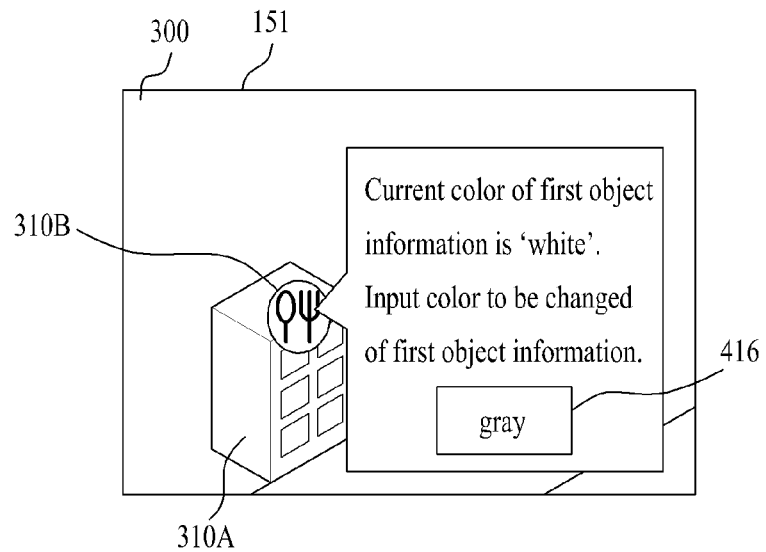
Figure 6D:
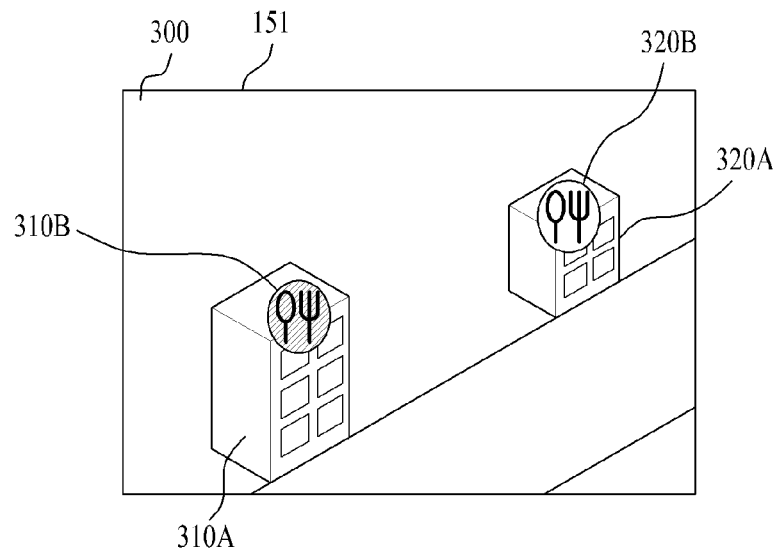

With reference to FIG. 6A, a color change function 412 can be selected from the UI 410. A command for changing the color of the object information 310B can then be input as shown in FIG. 6B or FIG. 6C. As shown in FIG. 6D, the controller 180 can change the color of the object information 310B according to the corresponding command for changing the size of the object information 310B.

In FIG. 6B, the command for changing the color of the object information 310B is input by selecting a desired color from a color table 415. More specifically, when a specific color is selected from the color table 415, the controller 180 changes the color of the object information 310B to the selected color.

In FIG. 6C, the command for changing the color of the object information 310B can be input via a color input window 416, which can be used to input a color to be applied to the object information 310B. For example, when a name of a color is input in the color input window 416, the controller 180 can change the color of the object information 310B to the named color in the color input window 416.

Figure 7A:
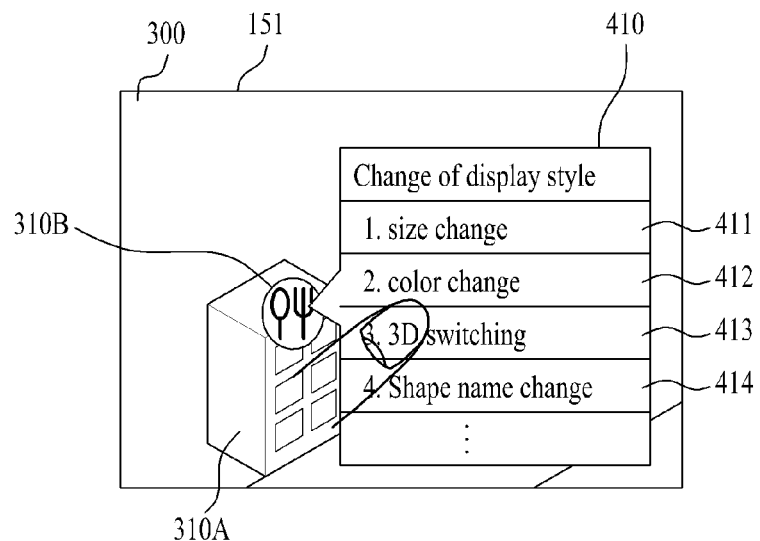
Figure 7B:
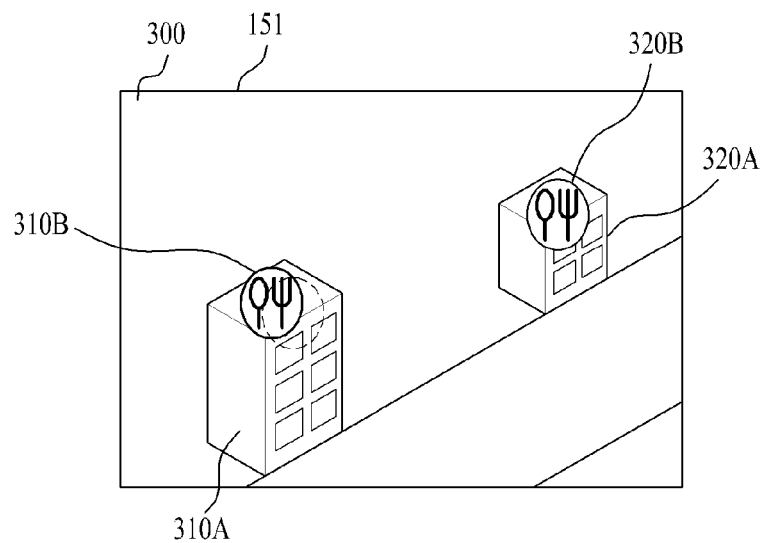

With reference to FIG. 7A, a three dimensional (3D) switching function 413 can be selected from the UI 410. As shown in FIG. 7B, the controller 180 can then display the object information 310B in 3D. More specifically, the memory 160 can store images of the object information 310B that correspond to the left eye and the right eye, and the controller 180 can merge the images corresponding to the left eye and the right eye into a single image to enable the object information 310B to be viewed in 3D.

Figure 8A:
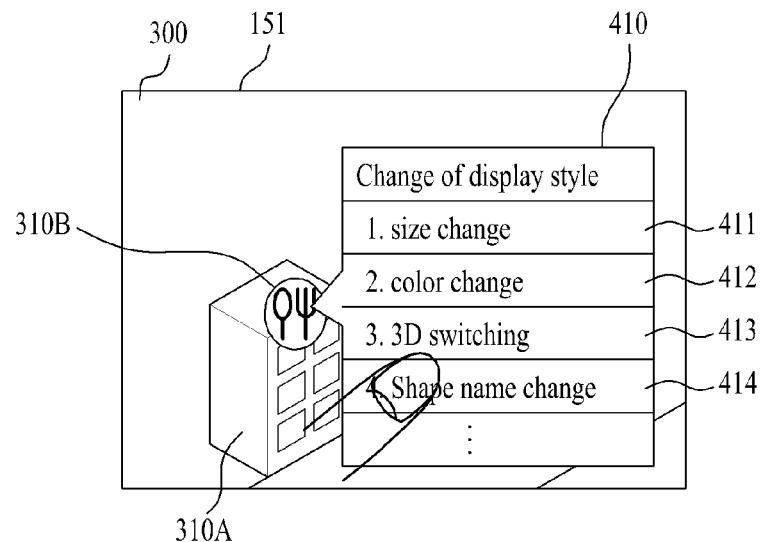
Figure 8B:
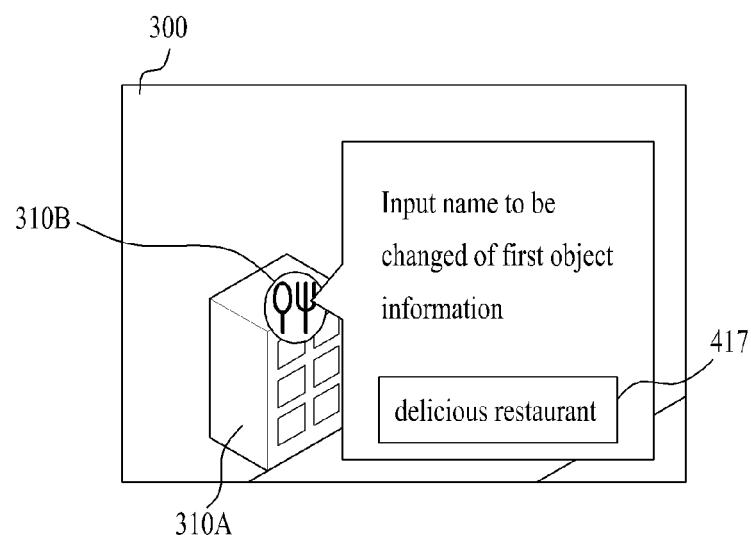
Figure 8C:
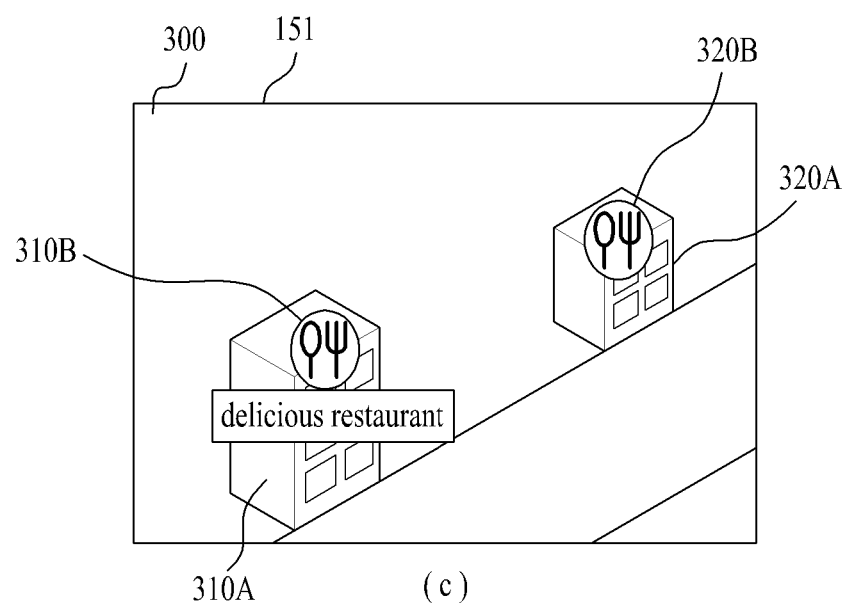

With reference to FIG. 8A, a name change function 414 can be selected from the UI 410. As shown in FIG. 8B, a name to be applied to the object information 310B is input in the name input window 417. The controller 180 then changes the name of the object information 310B to the name input in the input window 417 and displays the name as shown in FIG. 8C.

Therefore, after the preview image 300 has been edited by changing the display style of the object information 310B using one or more of the edit functions 411 through 414, the controller 180 can then store the edited preview image in the memory 160 together with position information of the edited preview image [S170]. The controller can then transmit the edited and stored preview image to a contact address of a specific other mobile terminal through the wireless communication unit 110 [S180].

In one embodiment, the controller 180 can display the preview image 300 by enlarging it according to a magnifying power. The magnifying power can be set before or after editing of the object information 310B is performed.

More specifically, the controller 180 can display the preview image 300 by enlarging it according to the magnifying power before the object information 310B is edited, in order to allow the user to edit the object information 310B in greater detail. Alternatively, the controller 180 can display the preview image 300 by enlarging it according to the magnifying power after the object information 310B has been edited, in order to allow the user to identify the object information 310B in greater detail.

It should be understood that the previously described embodiments and examples for changing a display style of the object information 310B can also be similarly applied to change the objects in the preview image 300, such as the objects 310A and 320A.

According to another embodiment of the present invention, the appearance of a specific object or object information in a preview image of the AR mode can be edited using a UI that provides an edit function for distinguishing the object or the object information within the preview image 300. FIGS. 9A through 12B illustrate display screens of the display unit 151 showing an operation for distinguishing a specific object or object information within the preview image 300 of the AR mode in accordance with various embodiments of the present invention.

Figure 9A:
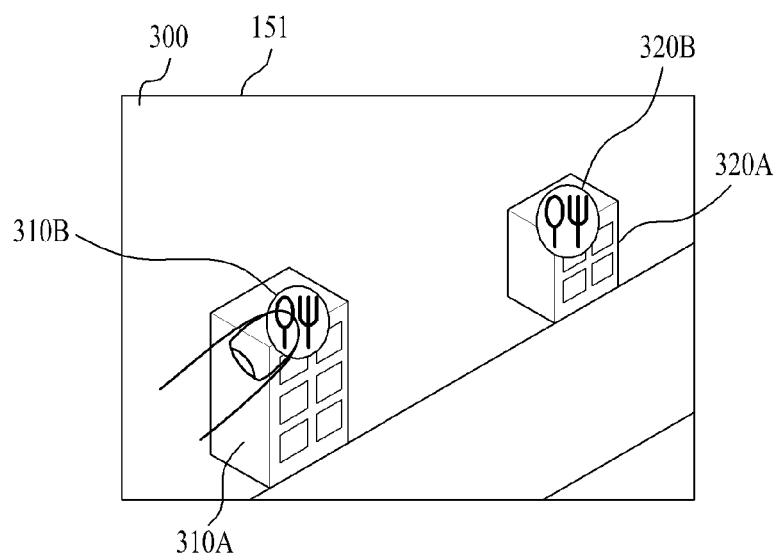
FIGS. 9A through 12B are exemplary display screens of the display unit of the mobile terminal showing an operation for distinguishing a specific object or object information within the preview image of the AR mode in accordance with various embodiments of the present invention.

As shown in FIG. 9A, an edit command for editing the object information 310B of the object 310A can be input to distinguish the object information 310B within the preview image 300 when the object information 310B and 320B of the objects 310A and 320A are displayed in the preview image 300 of the AR mode. The controller 180 can then display a UI 420 that provides one or more edit functions for distinguishing the object information 310B, as shown in FIG. 9B.

Figure 9B:
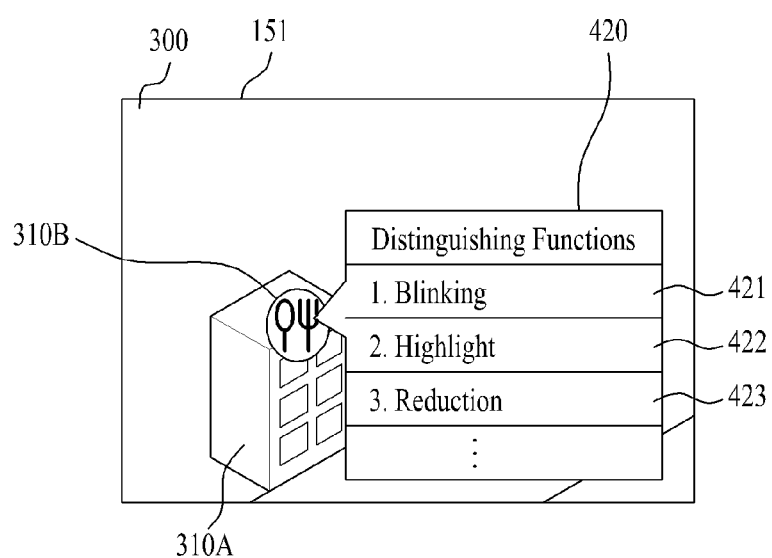

As shown in FIG. 9B, the UI 420 provides one or more edit functions for distinguishing the object information 310B selected from the preview image 300 in FIG. 9A. In the embodiment of FIG. 9B, the UI 420 includes edit functions, such as a blinking function 421, a highlight function 422, and a reduction function 423. It should be understood that the edit functions for distinguishing object information are not limited to the examples discussed herein, and the UI 420 can include all edit functions for distinguishing objects or object information within the preview image 300 of the AR mode.

An exemplary operation of the mobile terminal 100 for editing a preview image 300 of the AR mode by distinguishing the object information 310B using the editing functions 421, 422 and 423 included in the UI 420 will be described with reference to FIGS. 10A to 12B.

Figure 10A:
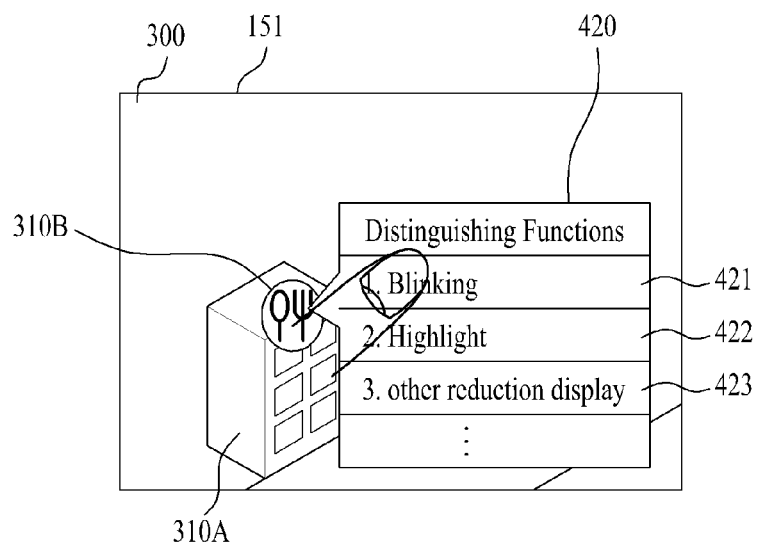
Figure 10B:
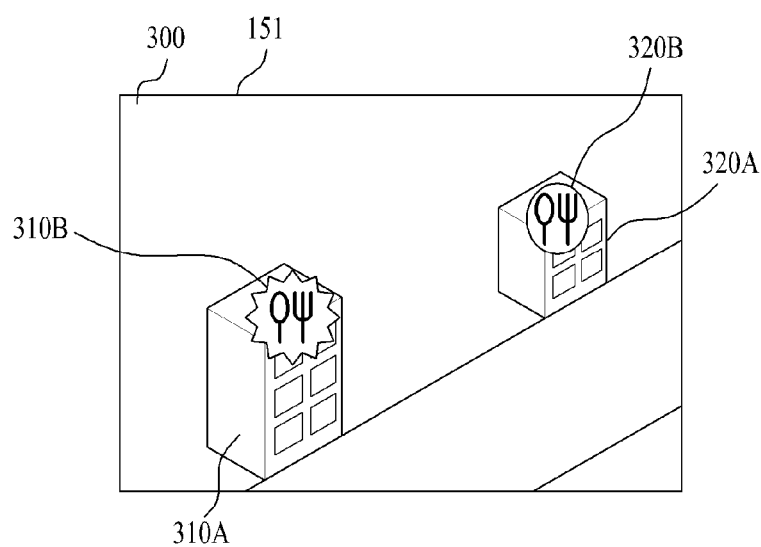

In FIG. 10A, the blinking function 421 for distinguishing the object information 310B is selected from the UI 420. In response to the selection, the controller 180 causes the object information 310B to blink according to a previously set period to distinguish the object information 310B in the preview image 300 as shown in FIG. 10B.

The user can edit and store the object information that is regarded as being most important in the preview image 300, such as the object information 310B, to distinguish the object information. The user can again view the preview image 300 including the distinguished object information 310B when the mobile terminal 100 returns to the position corresponding to the preview image 300.

In one embodiment, the user can edit the object information 310B of the object corresponding to a portion agreed to with another party to distinguish the object information 310B and transmit the edited object information 310B to the specific other mobile terminal of the other party. Accordingly, the other party using the specific other mobile terminal can easily recognize the object information 310B in the received preview image 300, where the object information 310B corresponds to the information on the portion agreed to with the user.

Figure 11A:
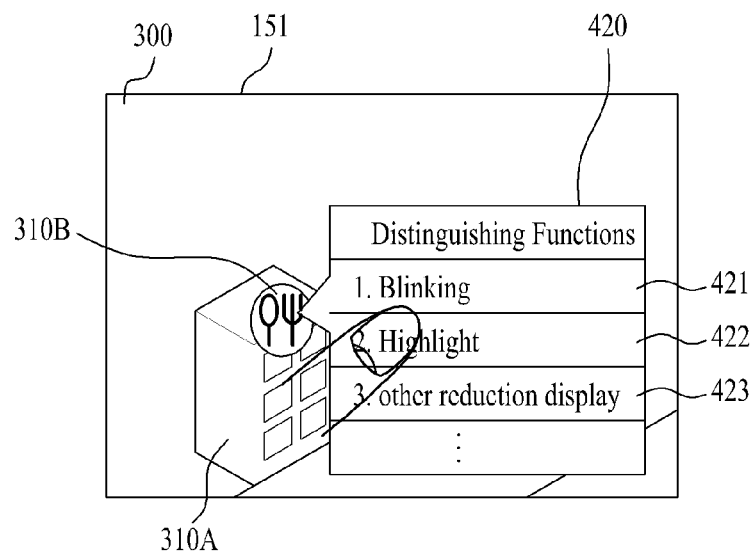
Figure 11B:
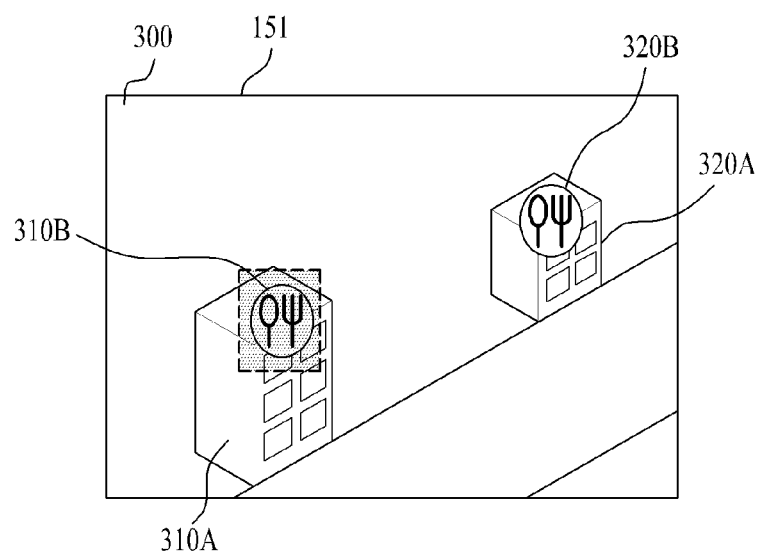

In FIG. 11A, the highlight function 422 for distinguishing the object information 310B is selected from the UI 420. In response to the selection, the controller 180 causes the object information 310B to be highlighted within the preview image 300 as shown in FIG. 11B.

Figure 12A:
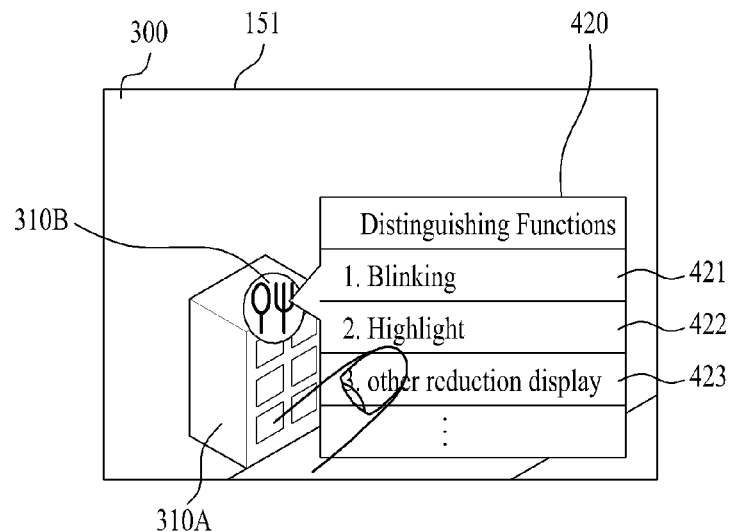
Figure 12B:
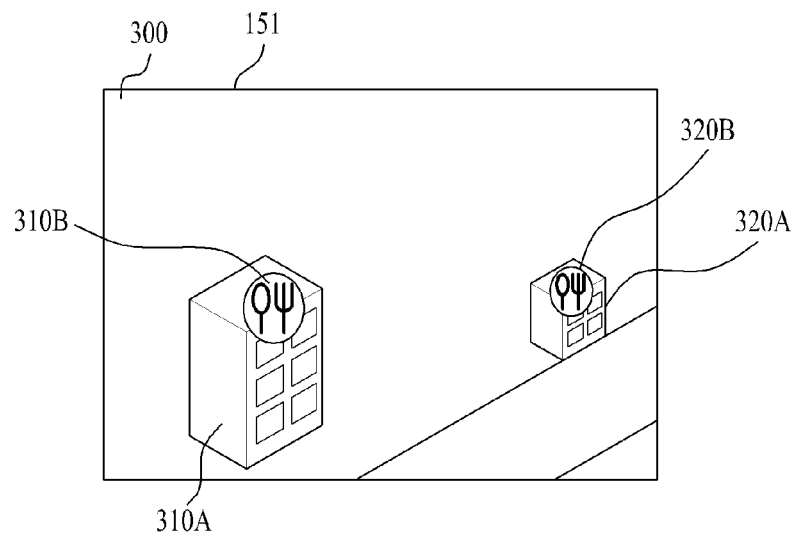

In FIG. 12A, the reduction function 423 for distinguishing the object information 310B is selected from the UI 420. In response to the selection, the controller 180 reduces the size of the object 320A and the object information 320B while maintaining the original size of the object 310A and the object information 310B within the preview image 300 as shown in FIG. 12B. Therefore, if the reduction function 423 is selected, the controller 180 temporarily stores the preview image 300 and displays the object 320A and the object information 320B with a reduced size with respect to the object 310A and the object information 310B within the temporarily stored preview image 300.

After the preview image 300 has been edited by distinguishing, for example, any object information using the editing functions 421, 422 and 423 as described with reference to FIGS. 9A to 12B, the controller 180 can then store the edited preview image in the memory 160 together with position information of the edited preview image [S170]. The controller 180 can then transmit the edited and stored preview image to a contact address of a specific other mobile terminal through the wireless communication unit 110 [S180].

It should be understood that the previously described embodiments and examples for distinguishing the object information 310B can be applied in the same manner to distinguish the objects in the preview image 300, such as the objects 310A and 320A.

An operation of the mobile terminal 100 for editing a preview image of the AR mode by inserting a memo or scribble message will be described with reference to FIGS. 13A through 14C. In the embodiments of FIGS. 13A through 14C, a UI can provide memo and scribble message edit functions within the preview image.

Figure 13A:
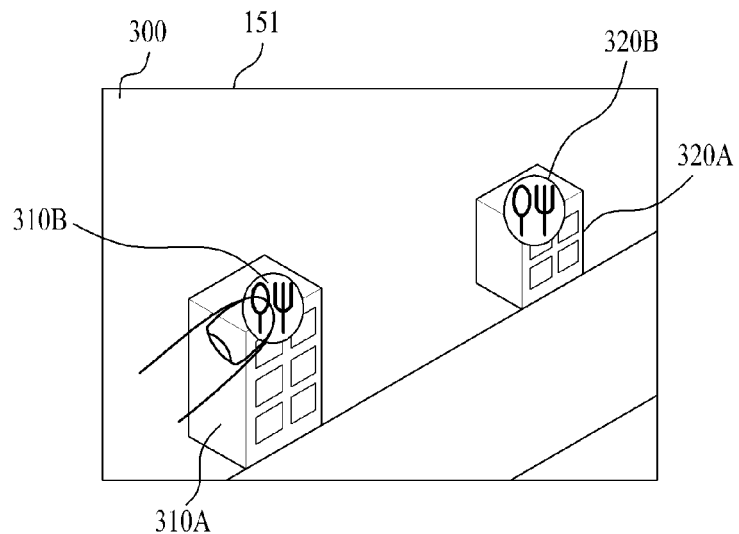
FIGS. 13A thorough 13C are exemplary display screens of the display unit of the mobile terminal showing an operation for editing a preview image of the AR mode by inputting a memo message in accordance with one embodiment of the present invention.
Figure 13B:
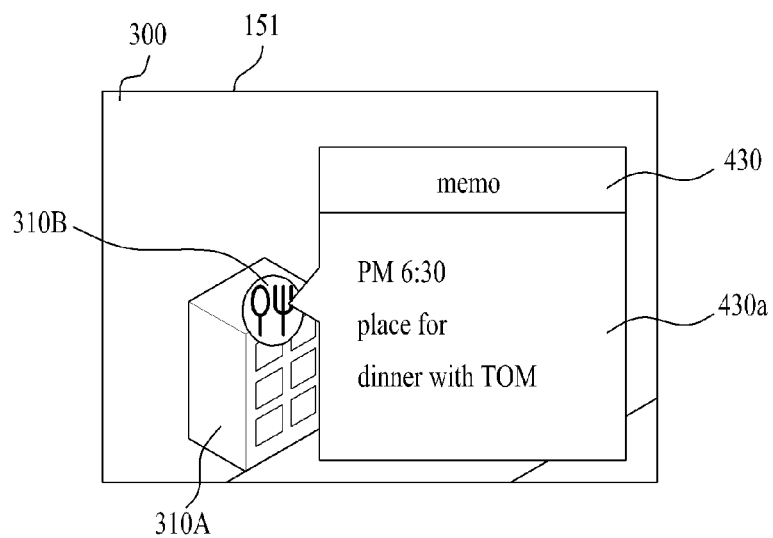
Figure 13C:
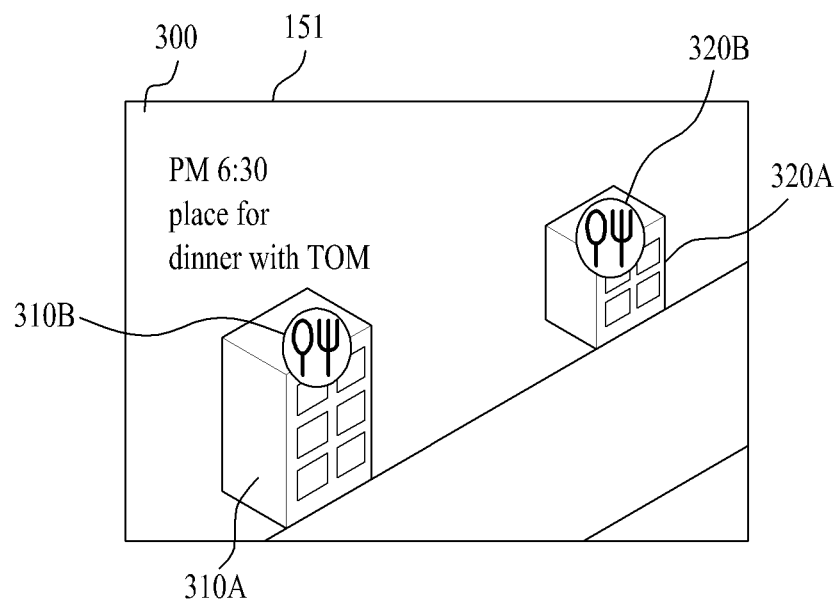

FIGS. 13A thorough 13C are exemplary display screens of the display unit 151 showing an operation for editing a preview image of the AR mode by inputting a memo message in accordance with one embodiment of the present invention. As shown in FIG. 13A, an edit command for inputting a memo message for the object information 310B of the object 310A can be input when the object information 310B of object 310A and the object information 320B of object 320A are displayed in the preview image 300 of the AR mode. As shown in FIG. 13B, the controller 180 then displays the UI 430 that provides an edit function for inputting a memo message to the object information 310B.

In the embodiment of FIG. 13B, the UI 430 is a memo message input window that can be used to input a memo message for the object information 310B. The controller 180 can display the memo message 430a input via the UI 430 by attaching the memo message 430a to the object information 310B, as shown in of FIG. 13C.

In one embodiment, the memo message 430a can be input on the background of an object or preview image 300, as well as on the object information. For example, if the memo message is input via the UI 430 after the object 310A is selected from the preview image 300, the controller 180 can display the memo message by attaching it to the object 310A. Alternatively, if the memo message is input via the UI 430 after a background portion within the preview image 300 is selected, the controller 180 can display the memo message by attaching it to the selected background portion within the preview image 300.

Figure 14A:
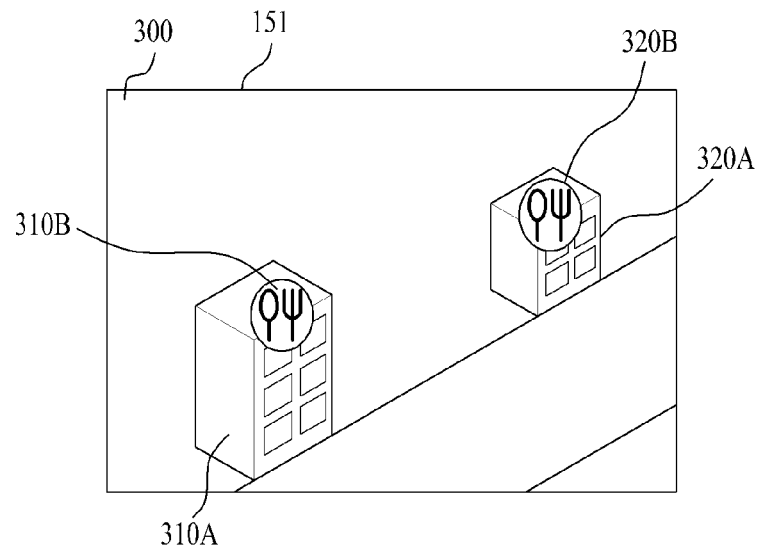
FIGS. 14A through 14C are exemplary display screens of the display unit of the mobile terminal showing an operation for editing a preview image of the AR mode by inputting a scribble message in accordance with one embodiment of the present invention.
Figure 14B:
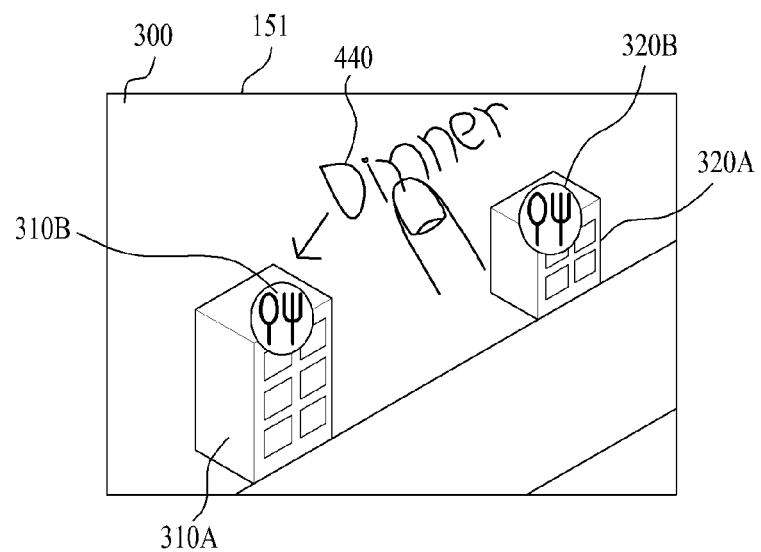
Figure 14C:
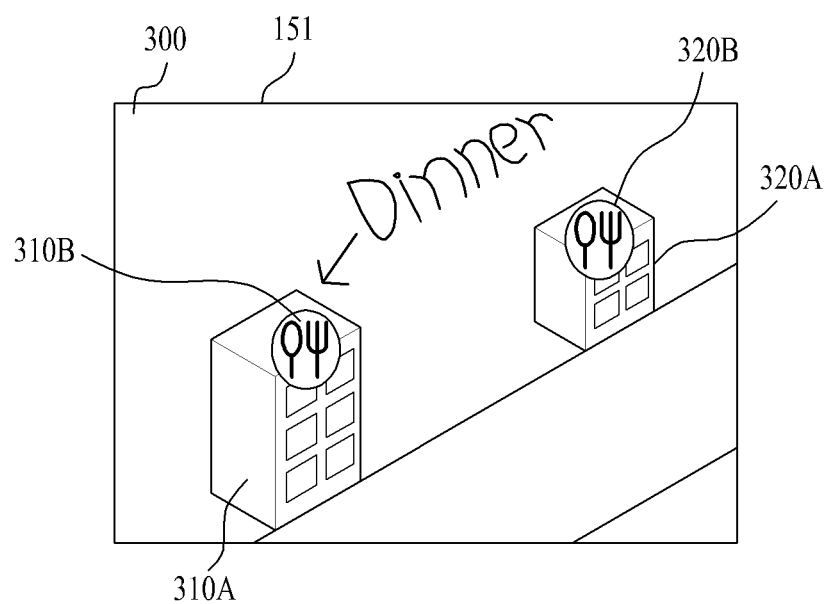

FIGS. 14A through 14C are exemplary display screens of the display unit 151 showing an operation for editing a preview image of the AR mode by inputting a scribble message in accordance with one embodiment of the present invention. In the embodiment of FIGS. 14A through 14C, the controller 180 enables a UI that provides an edit function for attaching a scribble message to the preview image 300 when a command for inputting a scribble message is input in the preview image 300 of the AR mode. For example, the UI can be configured to receive a scribble message that is manually input via a touch input performed by a user. When the user manually inputs the scribble message 440 on the preview image 300 by touching the display unit 151 as shown in FIG. 14B, the controller 180 can display the scribble message 440 input by the user in the preview image 300 as shown in FIG. 14C.

The controller 180 can convert the input memo message or scribble message to a file type and store the converted memo file or scribble file in the memory 160 together with the preview image. Therefore, the controller 180 can use the stored memo file or scribble file for other possible uses.

After the preview image 300 has been edited by inserting a memo or scribble message as described with reference to FIGS. 13A to 14C, the controller 180 can then store the edited preview image in the memory 160 together with position information of the edited preview image [S170]. The controller can then transmit the edited and stored preview image to a contact address of a specific other mobile terminal through the wireless communication unit 110 [S180].

An exemplary operation for editing a preview image of the AR mode by zooming in or zooming out of the preview image at a magnification power desired by the user will now be described with reference to FIGS. 15A through 16B. In the embodiments of FIGS. 15A through 16B, a UI can provide a zoom-in or zoom-out edit function for the preview image.

Figure 15A:
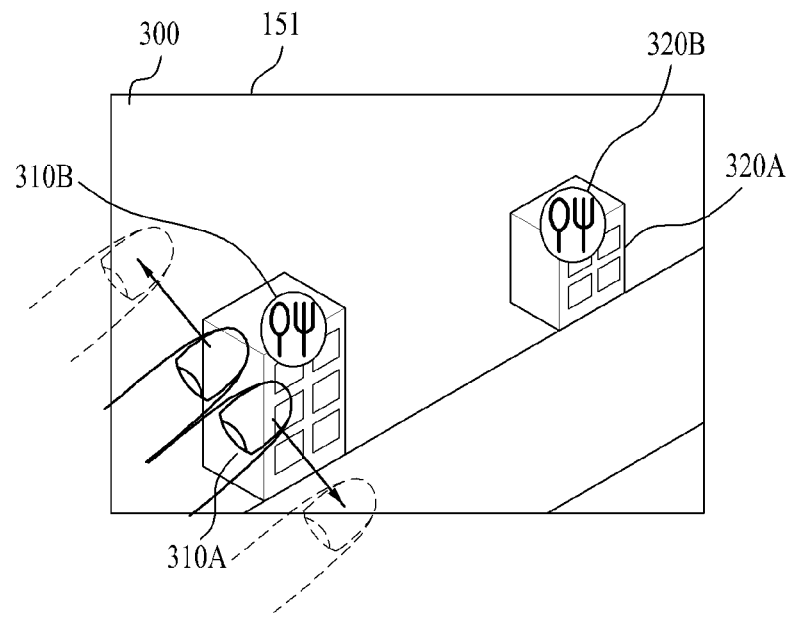
FIGS. 15A and 15B are exemplary display screens of the display unit of the mobile terminal showing an operation for editing a preview image of the AR mode by zooming in the preview image in accordance with one embodiment of the present invention.
Figure 15B:
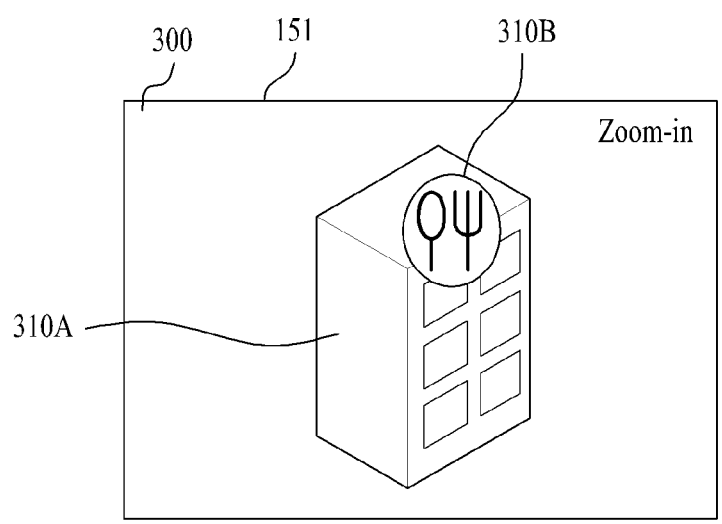

FIGS. 15A and 15B are exemplary display screens of the display unit 151 showing an operation for editing a preview image of the AR mode by zooming in the preview image in accordance with one embodiment of the present invention. As shown in FIG. 15A, an edit command for zooming in the preview image 300 can be input when the object information 310B of object 310A and the object information 320B of object 320A are displayed in the preview image 300 of the AR mode. As shown in FIG. 15B, the controller 180 then enables a UI that provides an edit function for zooming in the preview image 300.

In FIG. 15A, the UI is configured to receive a touch input from a user, such as a pinching-out multi-touch input performed on the object 310A, within the preview image 300. In response to the pinching-out multi-touch input, the controller 180 displays the preview image 300 by controlling the camera 121 and zooming in on a portion of the preview image 300 corresponding to the pinching-out multi-touch input, such as the object 310A shown in FIG. 15B.

Figure 16A:
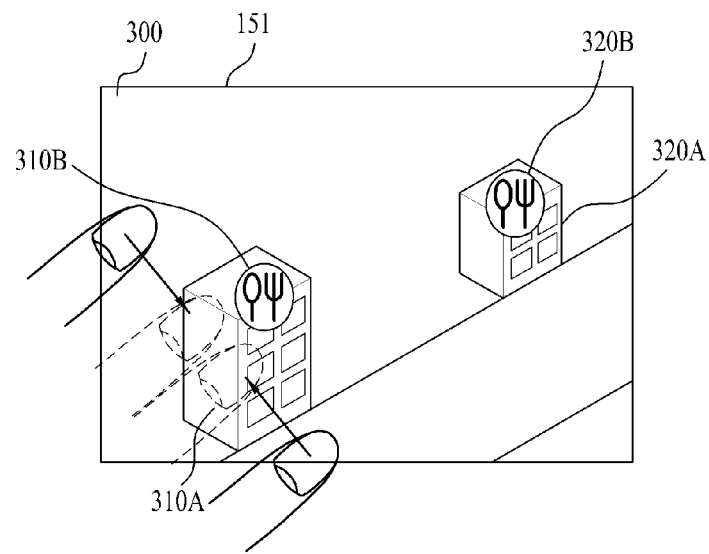
FIGS. 16A and 16B are exemplary display screens of the display unit of the mobile terminal showing an operation for editing a preview image of the AR mode by zooming out the preview image in accordance with one embodiment of the present invention.
Figure 16B:
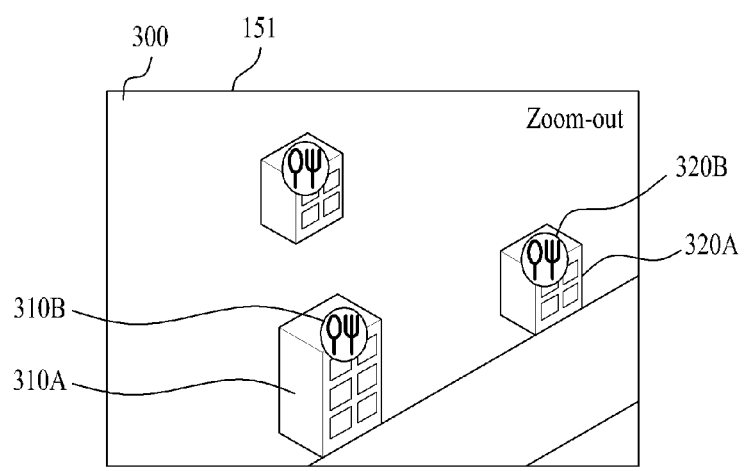

FIGS. 16A and 16B are display screens of the display unit 151 showing an operation for editing a preview image of the AR mode by zooming out the preview image in accordance with one embodiment of the present invention. As shown in FIG. 16A, an edit command for zooming out the preview image 300 can be input when the object information 310B of object 310A and the object information 320B of object 320A are displayed in the preview image 300 of the AR mode. As shown in FIG. 16B, the controller 180 then enables a UI that provides an edit function for zooming out the preview image 300.

In FIG. 16A, the UI is configured to receive a touch input from a user, such as a pinching-in multi-touch input performed on the object 310A, within the preview image 300. In response to the pinching-in multi-touch input, the controller 180 displays the preview image 300 by controlling the camera 121 and zooming out on a portion of the preview image 300 corresponding to the pinching-in multi-touch input, such as the object 310A shown in FIG. 16B.

In one embodiment, if the preview image 300 is zoomed in or zoomed out using the UIs previously discussed with respect to FIGS. 15A and 15B or FIGS. 16A and 16B, the controller 180 only stores a value representing the magnification power of the zoomed-in or zoomed-out preview image 300 and the position information of the preview image 300 in the memory 160. In other words, the controller 180 does not store the zoomed-in or zoomed-out preview image. Therefore, if the mobile terminal 100 is again located at the position corresponding to the portion of the preview image for which the value representing the magnification power is stored, the controller displays the preview image by applying the stored value to the preview image currently input from the camera 121.

After the preview image 300 has been edited by zooming in or zooming out as described with reference to FIGS. 15A to 16B, the controller 180 can then store the preview image and the value representing the magnification power in the memory 160 together with position information of the preview image [S170]. The controller can then transmit the stored preview image 300 and the value representing the magnification power together with the position information to a contact address of a specific other mobile terminal through the wireless communication unit 110 [S180].

An operation of the mobile terminal 100 for editing a preview image of the AR mode by linking specific information to the preview image will be described with reference to FIGS. 17A through 17D. In the embodiment of FIGS. 17A through 17D, a UI can provide an edit function for linking the specific information to the preview image. FIGS. 17A through 17D are exemplary display screens of the display unit 151 showing an operation for editing a preview image of the AR mode by linking specific information to the preview image in accordance with one embodiment of the present invention.

Figure 17A:
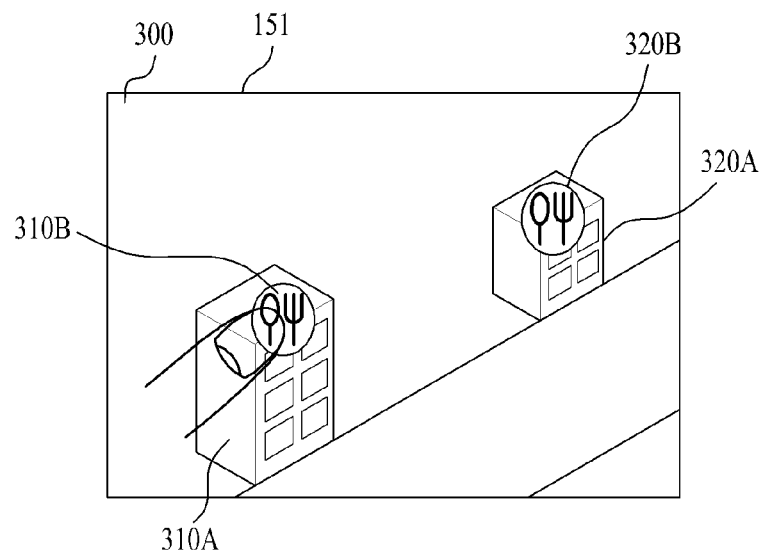
FIGS. 17A through 17D are exemplary display screens of the display unit of the mobile terminal showing an operation for editing a preview image of the AR mode by linking specific information to the preview image in accordance with one embodiment of the present invention.
Figure 17B:
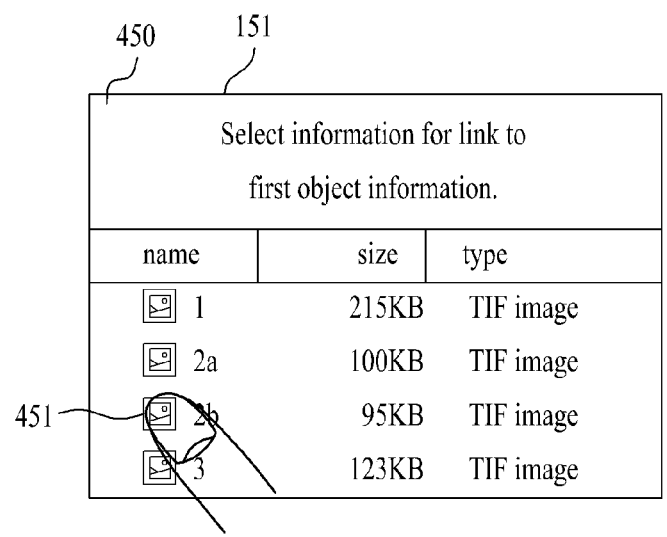

As shown in FIG. 17A, an edit command for linking specific information to the object information 310B can be input when the object information 310B of object 310A and the object information 320B of object 320A are displayed in the preview image 300 of the AR mode. As shown in FIG. 17B, the controller 180 then displays a UI, such as the UI 450, that provides an edit function for linking the specific information.

For example, the specific information can be information related to the object 310A and the object information 310B, and can be previously stored in the memory 160 or acquired through a Web site. Moreover, the specific information can be an image depicting the interior of the object 310A, a detailed outdoor image of the object 310A, or detailed information about the object 310A.

Figure 17C:
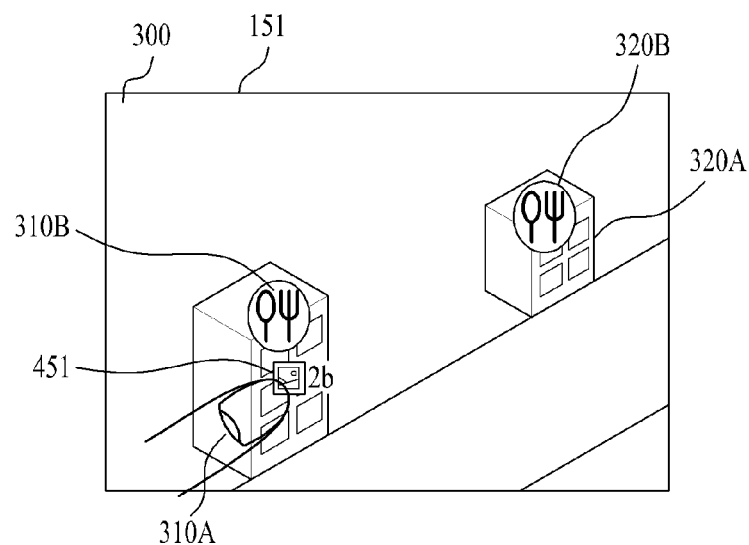

In the embodiment of FIGS. 17A through 17D, the UI 450 is an information selection window for linking a desired information item stored in the memory 160 to the object information 310B. For example, if a desired information item 451 is selected via the UI 450 as shown in FIG. 17B, the controller 180 can display the information item 451 by linking it to the object information 310B, as shown in FIG. 17C.

Figure 17D:
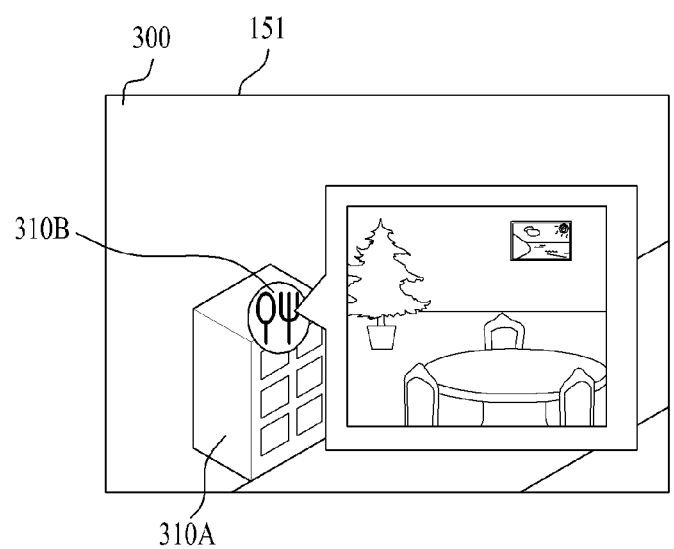

As shown in FIG. 17D, the controller 180 can display the information item 451 linked to the object information 310B when the information item 451 is selected. Alternatively, the controller 180 can display the information 451 if the object 310A or the object information 310B linked to the information 451 is selected from the preview image 300.

After the preview image 300 has been edited by linking the specific information to the preview image 300 as described with reference to FIGS. 17A to 17D, the controller 180 can then store the edited preview image in the memory 160 together with position information of the edited preview image [S170]. The controller can then transmit the edited and stored preview image to a contact address of a specific other mobile terminal through the wireless communication unit 110 [S180].

Exemplary operations of the mobile terminal 100 for editing a preview image of the AR mode by searching for an image associated with a search keyword and editing the preview image by merging the image with the preview image will be described with reference to FIGS. 18A through 20C, which show exemplary display screens of the display unit 151 showing various operations for editing a preview image of the AR mode by searching for an image associated with a search keyword and editing the preview image by merging the image with the preview image in accordance with various embodiments of the present invention. In the embodiments of FIGS. 18A through 20C, a UI can provide an edit function for searching for an image according to a search keyword and merging the image with the preview image.

Figure 18A:
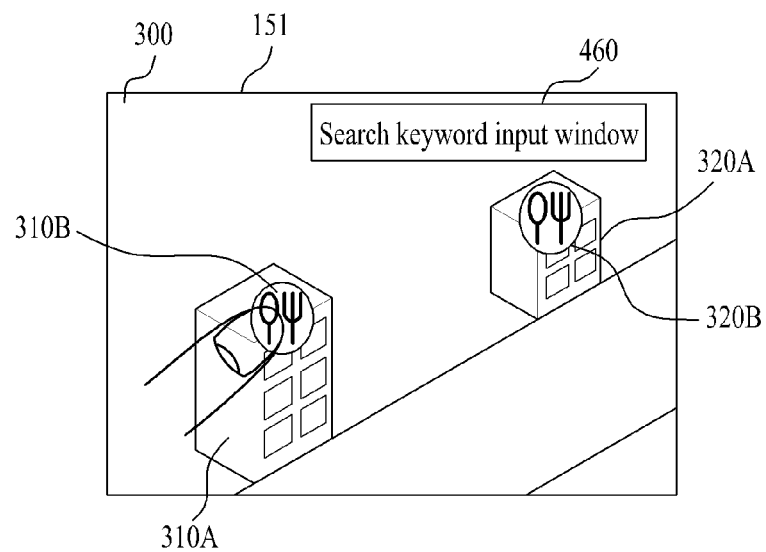
FIGS. 18A through 20C are exemplary display screens of the display unit of the mobile terminal showing various operations for editing a preview image of the AR mode by searching for an image associated with a search keyword and editing the preview image by merging the image with the preview image in accordance with various embodiments of the present invention.
Figure 18B:
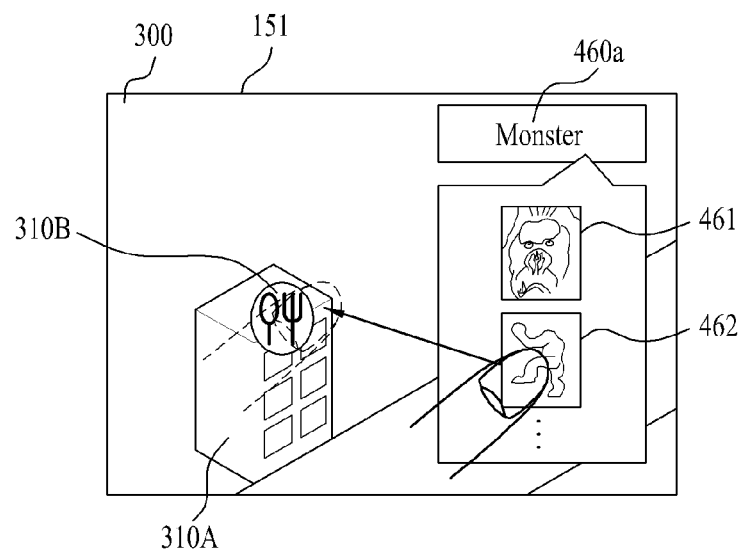

As shown in FIG. 18A, the controller 180 displays the UI 460, which is used to search for an image to be merged with the preview image 300. For example, when the term "monster" is input as the search keyword 460a via the UI 460 as shown in FIG. 18B, the controller 180 searches images related to the search keyword 460a from the memory 160. In another embodiment, the controller 180 can access a Web site using the wireless communication unit 110 and search for images within the Web site that are related to the search keyword 460a.

Figure 18C:
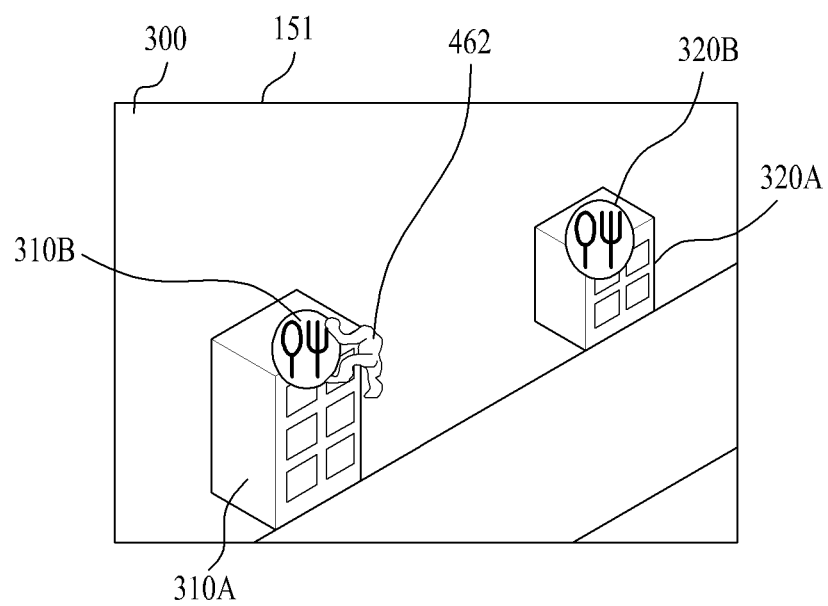

The controller 180 can display the images 461 and 462 found by the search. As shown in FIG. 18C, a specific one of the images 461 and 462, such as the image 462, can be dragged and dropped on a specific zone of the preview image 300. The controller 180 can then merge the image 462 with the preview image 300 at the specific zone as shown in FIG. 18C.

Figure 19A:
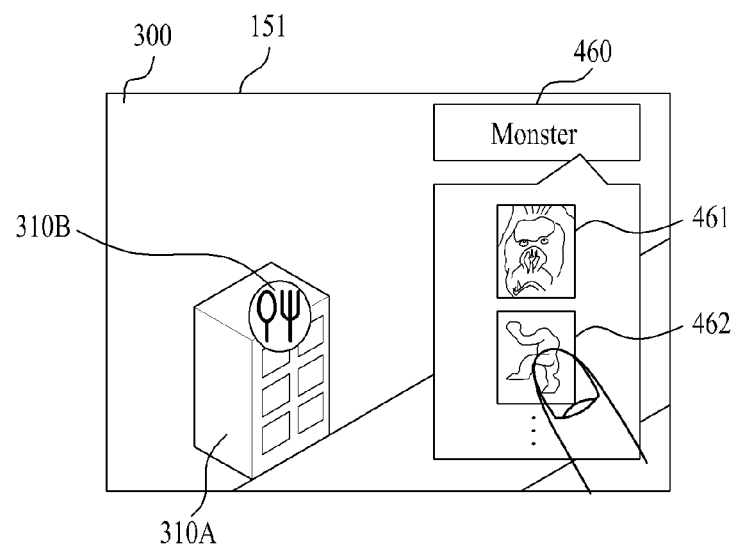
Figure 19B:
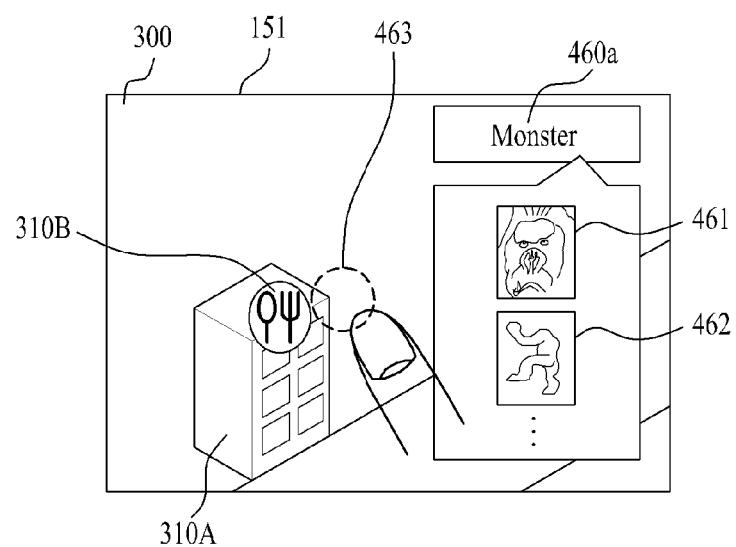
Figure 19C:
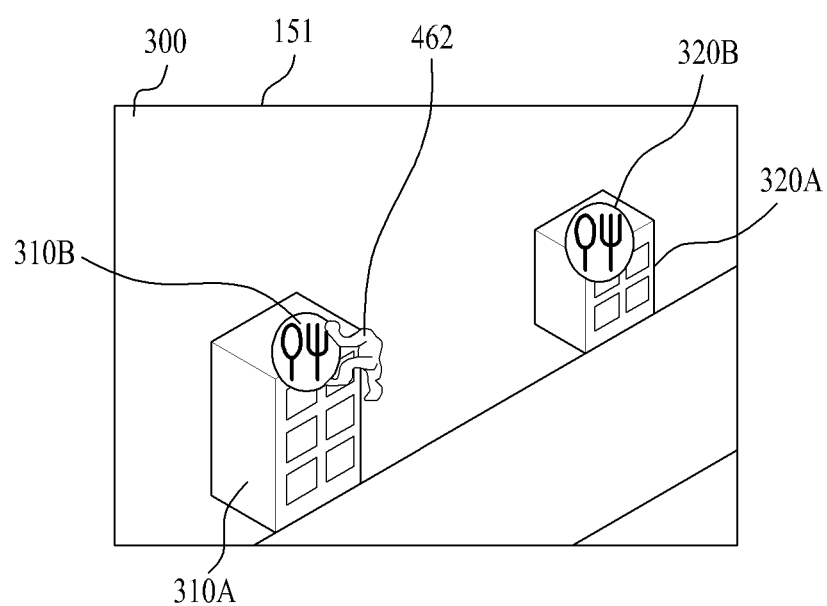

As shown in FIG. 19A, a specific one of the images 461 and 462, such as the image 462, is selected. When a zone 463 is designated within the preview image 300, as shown in FIG. 19B, the controller 180 can merge the selected image 462 with the preview image 300 at the designated zone 463, as shown in FIG. 19C.

Figure 20A:
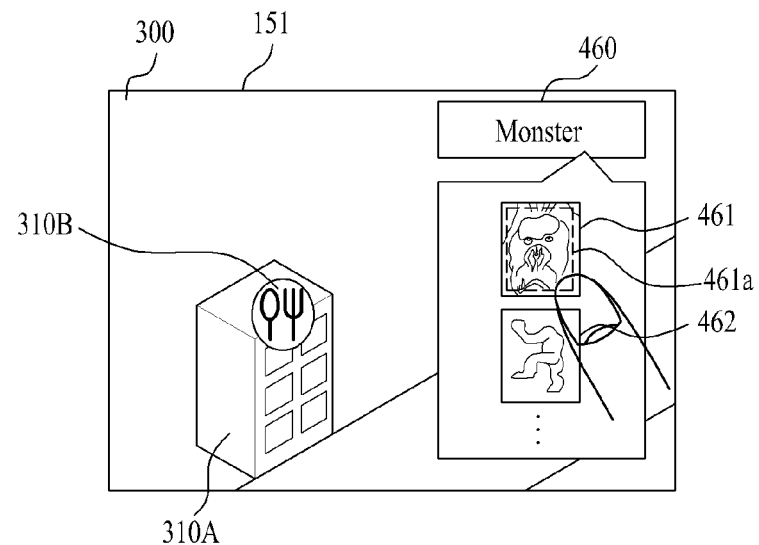
Figure 20B:
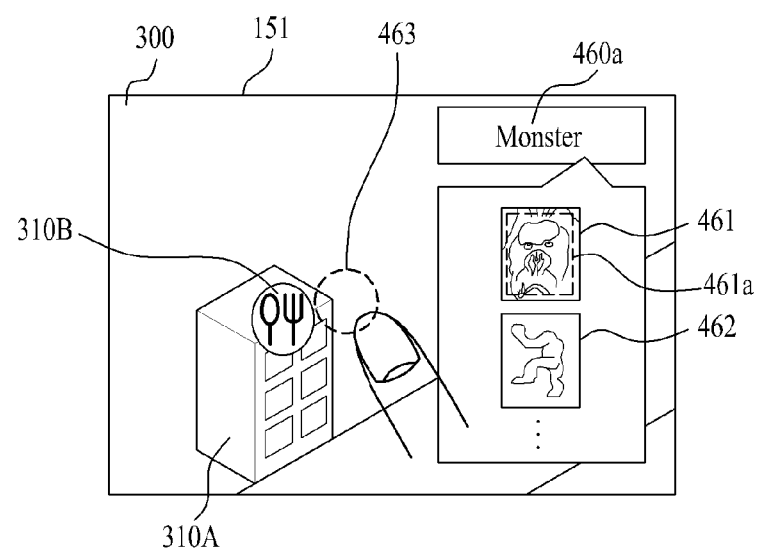
Figure 20C:
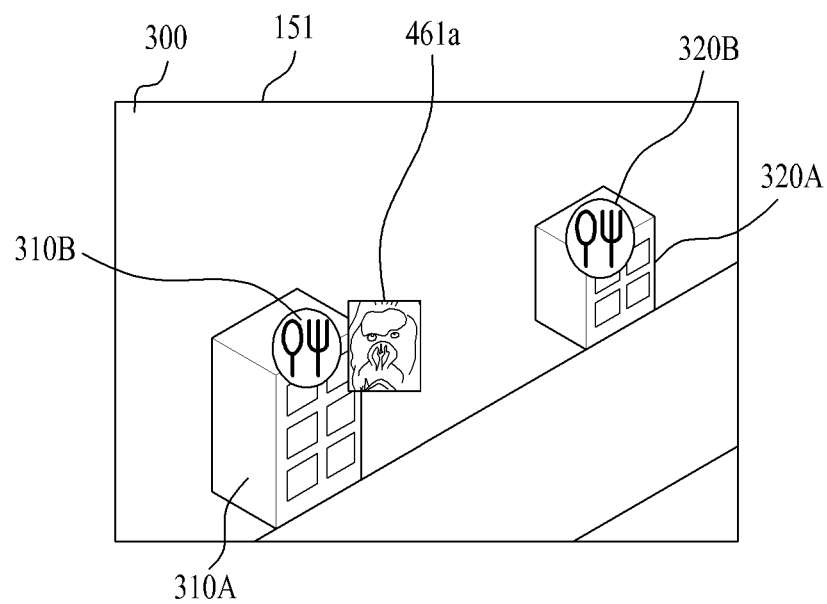

As shown in FIG. 20A, a specific one of the images 461 and 462, such as the image 461, is selected. When an area 461a for a crop operation is designated on the image 461 within the preview image 300, the controller 180 can perform a crop operation on a portion of the image 461 corresponding to the area 461a. As shown in FIG. 20B, when a zone 463 is designated within the preview image 300, the controller 180 can merge the cropped portion of the image 461 with the preview image 300 at the zone 463, as shown in FIG. 20C.

After the preview image 300 has been edited by searching for an image associated with a search keyword and editing the preview image by merging the image with the preview image 300 as described with reference to FIGS. 18A to 20C, the controller 180 can then store the edited preview image in the memory 160 together with position information of the edited preview image [S170]. The controller can then transmit the edited and stored preview image to a contact address of a specific other mobile terminal through the wireless communication unit 110 [S180].

Figure 21A:
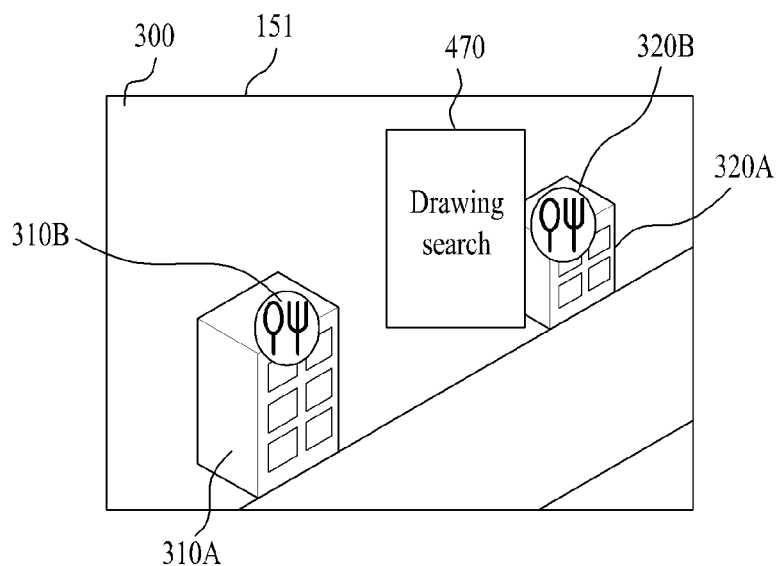
FIGS. 21A through 21C are exemplary display screens of the display unit of the mobile terminal showing an operation for editing a preview image of the AR mode by searching for an image according to a picture drawn by a user and editing the preview image by merging the image with the preview image in accordance with one embodiment of the present invention.
Figure 21B:
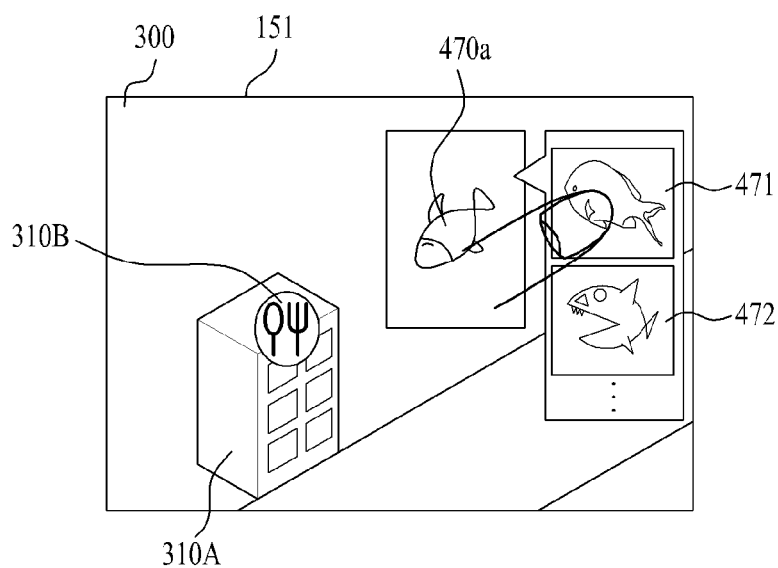
Figure 21C:
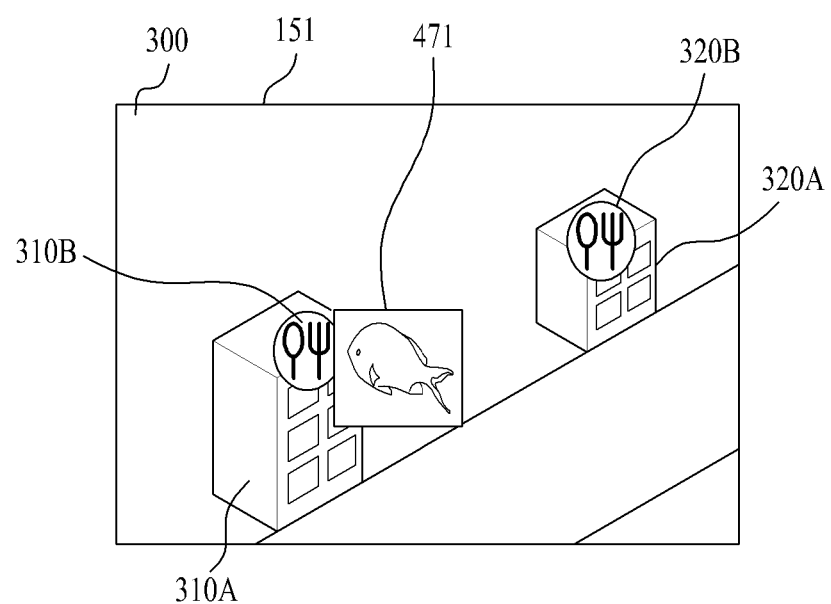

An operation of the mobile terminal 100 for editing a preview image of the AR mode by searching for an image according to a picture drawn by a user and editing the preview image by merging the image with the preview image will be described with reference to FIGS. 21A through 21C, which are exemplary display screens of the display unit 151 showing an operation for editing a preview image of the AR mode by searching for an image according to a picture drawn by a user and editing the preview image by merging the image with the preview image in accordance with one embodiment of the present invention. In the embodiment of FIGS. 21A through 21C, a UI can provide an edit function for searching for an image according to a picture drawn by a user and merging the image with the preview image.

As shown in FIG. 21A, the controller 180 can display the UI 470 that can be used to search for an image to be merged with the preview image 300. In the embodiment of FIG. 21A, the UI 470 is a picture board configured to receive a picture drawn by the user. As shown in FIG. 21B, when a picture 470a is drawn by the user via the UI 470, the controller 180 recognizes a shape of the picture 470a and searches images related to the picture 470a from images stored in the memory 160. Alternatively, the controller 180 can access a Web site using the wireless communication unit 110 and can search for images within the Web site that are related to the picture 470a.

As shown in FIG. 21B, the controller 180 can display the images 471 and 472 found by the search. When a specific image of the images 471 and 472, such as the image 471, is dragged and dropped in a specific zone of the preview image 300, the controller 180 can merge the image 471 with the preview image 300 at the specific zone as shown in FIG. 21C.

After the preview image 300 has been edited by searching for an image according to a picture drawn by a user and by merging the image with the preview image 300 as described with reference to FIGS. 21A to 21C, the controller 180 can then store the edited preview image in the memory 160 together with position information of the edited preview image [S170]. The controller can then transmit the edited and stored preview image to a contact address of a specific other mobile terminal through the wireless communication unit 110 [S180].

Figure 22A:
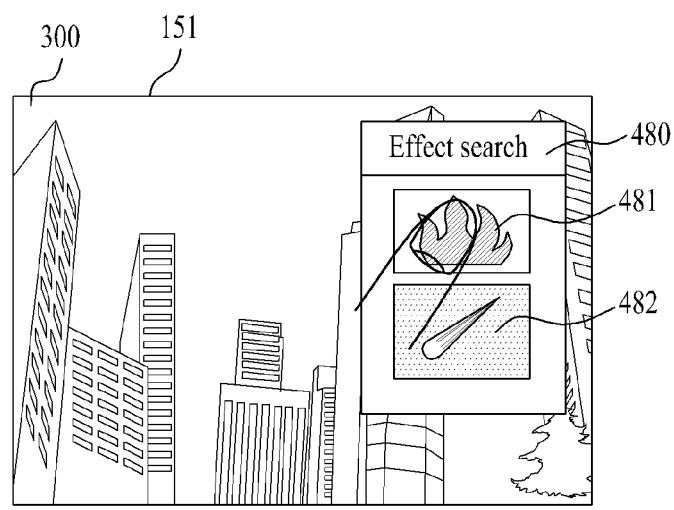
FIGS. 22A through 22C are exemplary display screens of the display unit of the mobile terminal showing an operation for editing a preview image of the AR mode by applying a graphic effect to the preview image in accordance with one embodiment of the present invention.
Figure 22B:
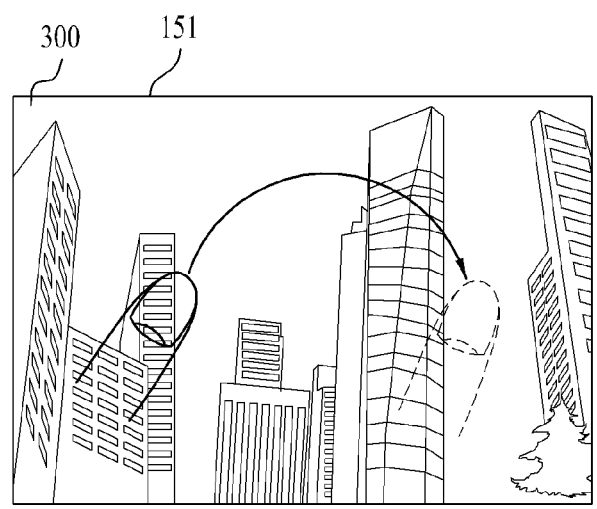
Figure 22C:
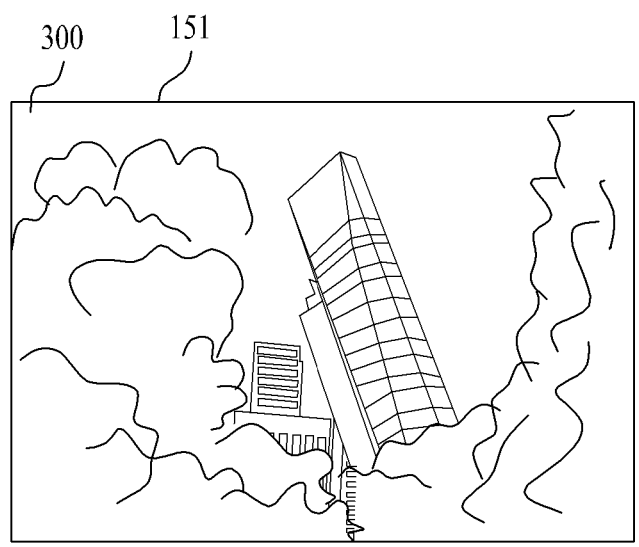

An operation of the mobile terminal 100 for editing a preview image of the AR mode by providing icons representing one or more graphic effects for the preview image, selecting one of the icons, and applying the graphic effect corresponding to the selected icon to the preview image will be described with reference to FIGS. 22A through 22C, which are exemplary display screens of the display unit 151 showing an operation for editing a preview image of the AR mode by applying a graphic effect to a preview image in accordance with one embodiment of the present invention. In the embodiment of FIGS. 22A through 22C, a UI can provide an edit function for applying a graphic effect corresponding to an icon to the preview image 300.

As shown in FIG. 22A, the UI 480 includes icons 481 and 482 which correspond to one or more graphic effects. A specific icon of the icons 481 and 482, such as the icon 481, is selected and a zone within the preview image 300 is designated for applying the graphic effect corresponding to the selected icon 481 as shown in FIG. 22B. The controller 180 then applies the graphic effect to the designated zone as shown in FIG. 22C.

After the preview image 300 has been edited by applying the graphic effect corresponding to the selected icon to the preview image 300 as described with reference to FIGS. 22A to 22C, the controller 180 can then store the edited preview image in the memory 160 together with position information of the edited preview image [S170]. The controller can then transmit the edited and stored preview image to a contact address of a specific other mobile terminal through the wireless communication unit 110 [S180].

Figure 23A:
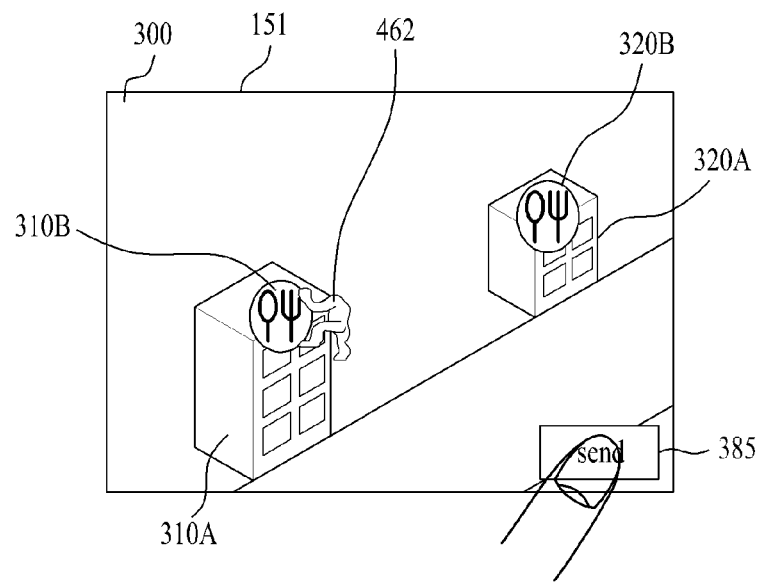
FIGS. 23A through 23C are exemplary display screens of the display unit of the mobile terminal showing an operation for transmitting an edited preview image to a mobile terminal of another party in accordance with one embodiment of the invention.
Figure 23B:
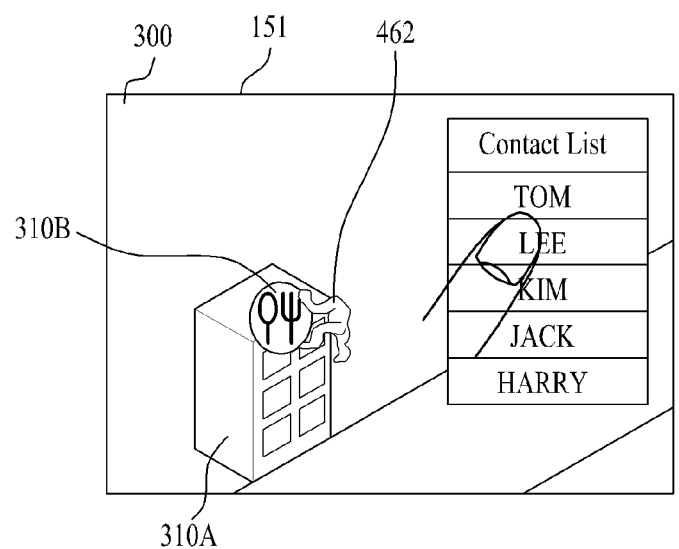
Figure 23C:
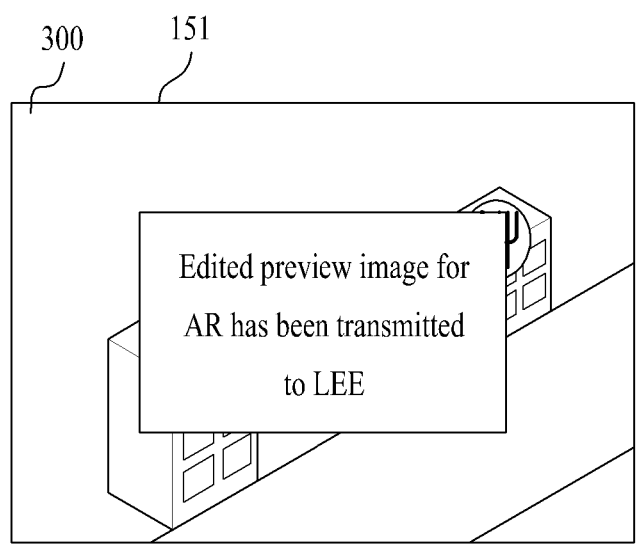

An operation of the mobile terminal 100 for transmitting a preview image edited by the operations previously discussed with respect to FIGS. 3 to 22C to a mobile terminal of another party or an external server will be described with reference to FIGS. 23A through 24B. FIGS. 23A through 23C are exemplary display screens of the display unit 151 showing an operation for transmitting a preview image edited using the operations previously discussed with respect to FIGS. 3 to 22C to a mobile terminal of another party in accordance with one embodiment of the invention.

As shown in FIG. 23A, when the preview image 300 has been edited by the operations previously discussed with respect to FIGS. 3 to 22 and a command 385 is input for transmitting the edited preview image 300 to the mobile terminal of another party, the controller 180 can display a list of contact addresses of a number of mobile terminals of other parties. The list of contact addresses are registered in a phonebook stored in the memory 160, as shown in FIG. 23B.

For example, if the contact address "LEE" corresponding to a mobile terminal of another party is selected from the list of contact addresses in FIG. 23B, the controller 180 can transmit a signal that includes the edited preview image 300 to the selected mobile terminal of the other party by controlling the wireless communication unit 110, as shown in FIG. 23C. In one embodiment, the controller 180 can further include position information of the edited preview image 300 in the signal transmitted to the mobile terminal of the other party. Therefore, after receiving the edited preview image 300 and the position information from the mobile terminal, the other party's mobile terminal can display the received preview image 300 when the current position corresponds to the received position information.

In one embodiment, the mobile terminal of the other party can display the edited preview image 300 received from the mobile terminal 100 without the position information of the preview image 300 when the mobile terminal of the other party is again located at the position corresponding to the portion where the preview image 300 was edited. In other words, after receiving the edited preview image 300, the mobile terminal of the other party can display the edited preview image 300 when the preview image currently input from the camera of the mobile terminal of the other party is the same as the received preview image 300.

In another embodiment, when the mobile terminal of the other party again displays the edited preview image 300 received from the mobile terminal 100, the mobile terminal of the other party can identify the position of the preview image currently input from its camera and the position of the edited preview image 300. The mobile terminal of the other party can then calculate the distance to reach the portion corresponding to the edited preview image 300, a time period and route for traveling to the portion corresponding to the edited preview image 300 from the current position, and display the calculated distance, time period, and route.

Figure 24A:
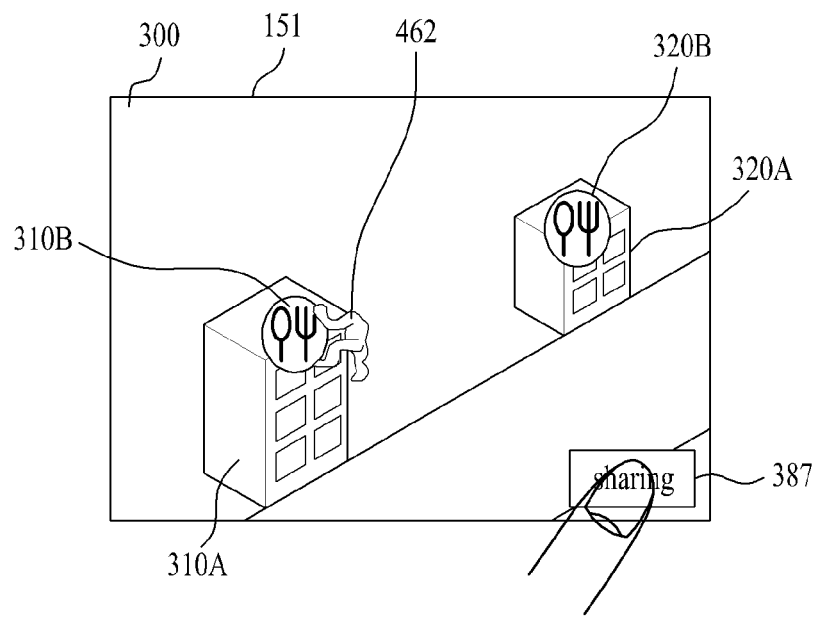
FIGS. 24A and 24B are exemplary display screens of the display unit of the mobile terminal showing an operation for transmitting an edited preview image to an external sharing server in accordance with one embodiment of the present invention.
Figure 24B:
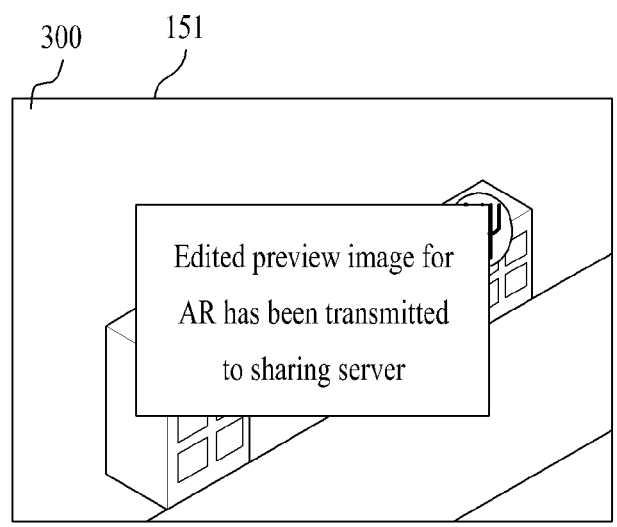

FIGS. 24A and 24B are exemplary display screens of the display unit 151 showing an operation for transmitting a preview image edited using the operations previously discussed with respect to FIGS. 3 to 22C to an external sharing server in accordance with one embodiment of the present invention. As shown in FIG. 24A, when the preview image 300 has been edited by the operations previously discussed with respect to FIGS. 3 to 22C and a command 387 is input for transmitting the edited preview image 300 to the external sharing server, the controller 180 can transmit a signal that includes the edited preview image 300 to the external sharing server by controlling the wireless communication unit 110, as shown in FIG. 24B.

For example, the external sharing server can be a server that allows two or more mobile terminals to share preview images edited by the two or more mobile terminals. The controller 180 transmits the edited preview image to the server in order to allowing sharing of the edited preview image with other mobile terminals.

As described herein, the mobile terminal according to the present invention and the method for controlling the mobile terminal provides the several advantages. For example, the present invention can allow a user to edit a preview image of the AR mode using various edit functions via a UI. Moreover, the mobile terminal 100 can share the preview image edited via the UI with a mobile terminal of another party by transmitting the edited preview image to the mobile terminal of the other party.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for controlling a mobile terminal, the method comprising:
displaying, on a display, a first image input by a camera in an augmented reality (AR) mode;
obtaining, via a position information unit, first position information of the mobile terminal when the first image is input;
displaying, on the display, object information about a first real world object in the first image based on the obtained first position information;
providing, on the display, a user interface (UI) for editing at least a portion of the first image including the object information about the first real world object in the AR mode in order to generate an edited first image;
storing, in a memory, the edited first image along with the first position information;
displaying, on the display, a second image input by the camera wherein the first image is no longer displayed;
obtaining, via the position information unit, second position information of the mobile terminal when the second image is input; and
displaying, on the display, the stored edited first image when the second position information is within a threshold distance of the stored first position information.

2. The method of claim 1, further comprising:
displaying a list including a contact corresponding to another mobile terminal; and
transmitting the edited first image to the another mobile terminal when the contact is selected from the list.

3. The method of claim 1, further comprising:
editing the at least a portion of the first image by changing an appearance of the object information or the first real world object in response to input received via the UI in accordance with at least one function.

4. The method of claim 3, wherein the at least one function is used to distinguish the object information or the first real world object in the first image.

5. The method of claim 3,
wherein editing the at least a portion of the first image comprises zooming-in or zooming-out of the first image in response to input received via the UI such that the edited first image is a zoomed-in or zoomed-out first image, and
wherein the method further comprises storing the zoomed-in or zoomed-out first image in the memory.

6. The method of claim 5, further comprising:
storing a value representing a magnification power of the zoomed-in or zoomed-out first image and the first position information of the zoomed-in or zoomed-out first image; and
applying the magnification power corresponding to the value to the second image when the second position information is within the threshold distance of the first position information.

7. The method of claim 3,
wherein editing the at least a portion of the first image comprises inputting a memo or scribble message on the first image in response to the input received via the UI, and
wherein the method further comprises storing the edited first image including the memo or scribble message in the memory.

8. The method of claim 1,
wherein the UI comprises a function for importing an import image onto the first image and merging the import image with the first image in order to generate the edited first image, and
wherein the method further comprises storing the edited first image including the import image in the memory.

9. The method of claim 8, wherein importing the import image comprises dragging and dropping the import image on a zone within the first image where the import image is to be merged, or designating a zone within the first image where the import image is to be merged.

10. The method of claim 8, wherein importing the import image comprises:
designating a first zone within the import image;
cropping the import image according to the first zone in order to generate a cropped image; and
designating a second zone within the first image where the cropped image is to be merged.

11. The method of claim 8, wherein the UI further comprises a function for receiving a keyword for searching the memory or the Internet for the import image.

12. The method of claim 1,
wherein the UI comprises a function for linking related information to the first image, and
wherein the method further comprises storing the first image and the related information to be associated with each other in the memory.

13. The method of claim 1, wherein displaying the stored edited first image comprises:
extracting an edited portion from the stored edited first image; and
displaying the extracted portion by overlaying or merging the extracted portion with a corresponding portion of the second image.

14. The method of claim 1, further comprising:
identifying a second real world object in the second image;
determining whether the second real world object is the same as the first real world object in the stored edited first image; and
displaying the stored edited first image when the second real world object is the same as the first real world object.

15. A mobile terminal comprising:
a memory;
a position information unit configured to obtain position information of the mobile terminal;
a camera;
a display; and
a controller configured to:
cause the display to display a first image input by the camera in an augmented reality (AR) mode;
cause the position information unit to obtain first position information of the mobile terminal when the first image is input;
cause the display to display object information about a first real world object in the first image based on the obtained first position information;
cause the display to display a user interface (UI) for editing at least a portion of the first image including the object information about the first real world object in the AR mode in order to generate an edited first image;
cause the memory to store the edited first image along with the first position information;
cause the display to display a second image input by the camera wherein the first image is no longer displayed;
cause the position information unit to obtain second position information of the mobile terminal when the second image is input; and
cause the display to display the stored edited first image when the second position information is within a threshold distance of the stored first position information.

16. The mobile terminal of claim 15, wherein the controller is further configured to:
cause the display to display a list including a contact corresponding to another mobile terminal; and
cause a wireless communication unit to transmit the edited first image to the another mobile terminal when the contact is selected from the list.

17. The mobile terminal of claim 15, wherein the controller is further configured to edit the at least a portion of the first image by changing an appearance of the object information or the first real world object in response to input received via the UI in accordance with at least one function.

18. The mobile terminal of claim 17, wherein the at least one function is used to distinguish the object information or the first real world object in the first image.

19. The mobile terminal of claim 15, wherein:
the controller is further configured to edit the at least a portion of the first image by zooming-in or zooming-out of the first image in response to input received via the UI such that the edited first image is a zoomed-in or zoomed-out first image; and
the controller is further configured to cause the memory to store the zoomed-in or zoomed-out first image.

20. The mobile terminal of claim 19, wherein the controller is further configured to:
cause the memory to store a value representing a magnification power of the zoomed-in or zoomed-out first image and the first position information of the zoomed-in or zoomed-out first image; and
apply the magnification power corresponding to the value to the second image when the second position information is within the threshold distance of the stored first position information.

21. The mobile terminal of claim 15, wherein the controller is further configured to:
edit the at least a portion of the first image by receiving a memo or scribble message input on the first image via the UI; and
cause the memory to store the edited first image including the memo or scribble message.

22. The mobile terminal of claim 15, wherein the UI comprises a function for importing an import image onto the first image and merging the import image with the first image in order to generate the edited first image; and
cause the memory to store the edited first image including the import image.

23. The mobile terminal of claim 22, wherein importing the import image comprises dragging and dropping the import image on a zone within the first image where the import image is to be merged or designating a zone within the first image where the import image is to be merged.

24. The mobile terminal of claim 22, wherein importing the import image comprises:
designating a first zone within the import image;
cropping the import image according to the first zone to generate a cropped image; and
designating a second zone within the first image where the cropped image is to be merged.

25. The mobile terminal of claim 22, wherein the UI further comprises a function for receiving a keyword for searching the memory or the Internet for the import image.

26. The mobile terminal of claim 15, wherein the UI comprises a function for linking related information to the first image; and
the controller is further configured to cause the memory to store the first image and the related information to be associated with each other in the memory.

27. The mobile terminal of claim 15, wherein the controller is further configured to:
extract an edited portion from the stored edited first image; and
cause the display to display the extracted portion by overlaying or merging the extracted portion with a corresponding portion of the second image.

28. The mobile terminal of claim 15, wherein the controller is further configured to:
identify a second real world object in the second image;

determine whether the second real world object is the same as the first real world object in the stored edited first image; and cause the display to display the stored edited first image when the second real world object is the same as the first real world object.

* * * * *